Figure 1:
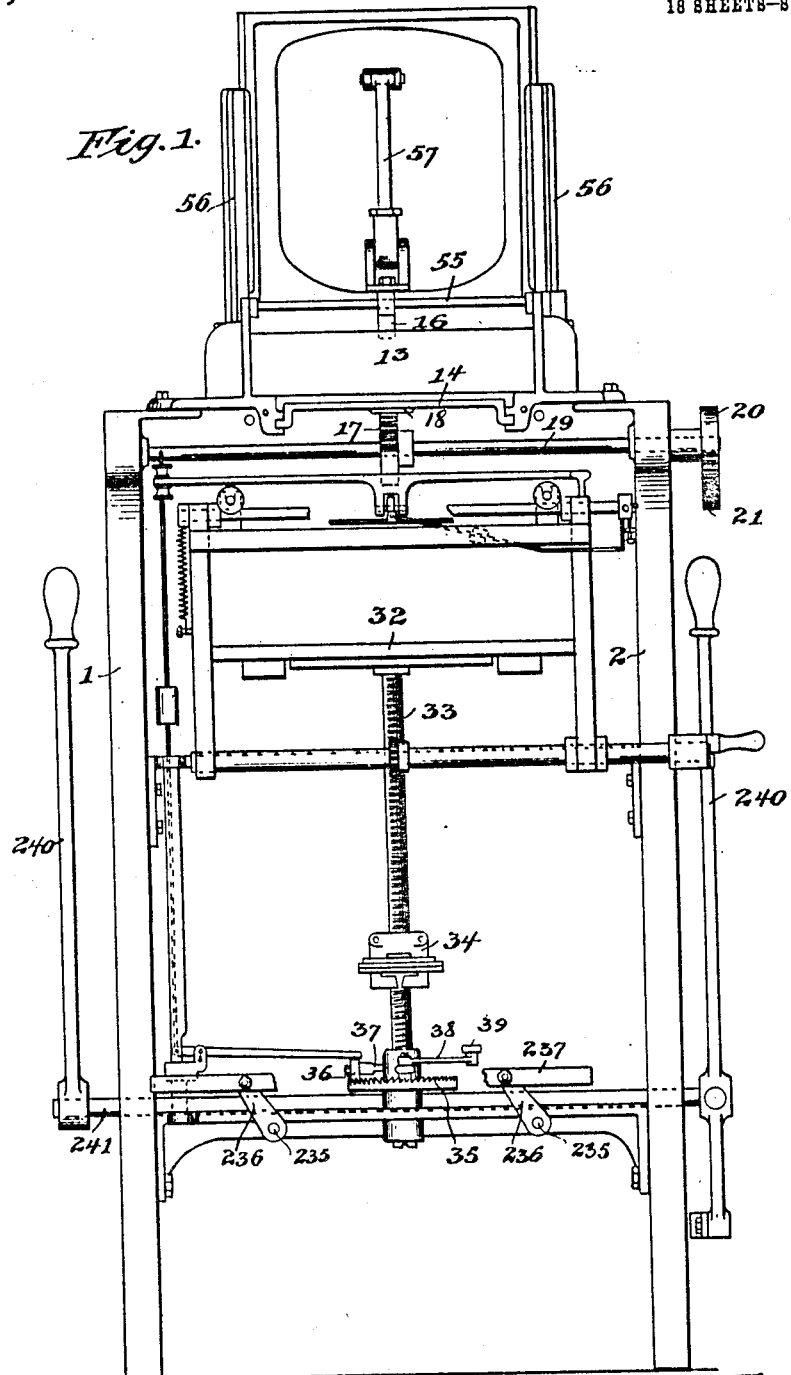

F. M. PETERS & H. H. HUNGERFORD.
MACHINE FOR WRAPPING PACKAGES.
APPLICATION FILED MAY 24, 1905.

1,043,863.

Patented Nov. 12, 1912.

18 SHEETS—SHEET 3.

F. M. PETERS & H. H. HUNGERFORD.
MACHINE FOR WRAPPING PACKAGES.
APPLICATION FILED MAY 24, 1905.

1,043,863.

Patented Nov. 12, 1912.
18 SHEETS—SHEET 4.

Witnesses,

Inventors,
Frank M. Peters
Henry H. Hungerford
By Offield, Towle & Linthicum
Attys.

F. M. PETERS & H. H. HUNGERFORD.
MACHINE FOR WRAPPING PACKAGES.
APPLICATION FILED MAY 24, 1905.

1,043,863.

Patented Nov. 12, 1912.

18 SHEETS—SHEET 5.

Witnesses,
E. S. Mann
S. N. Pond

Inventors,
Frank M. Peters
Henry H. Hungerford
By Offield, Towle & Linthicum
Attys.

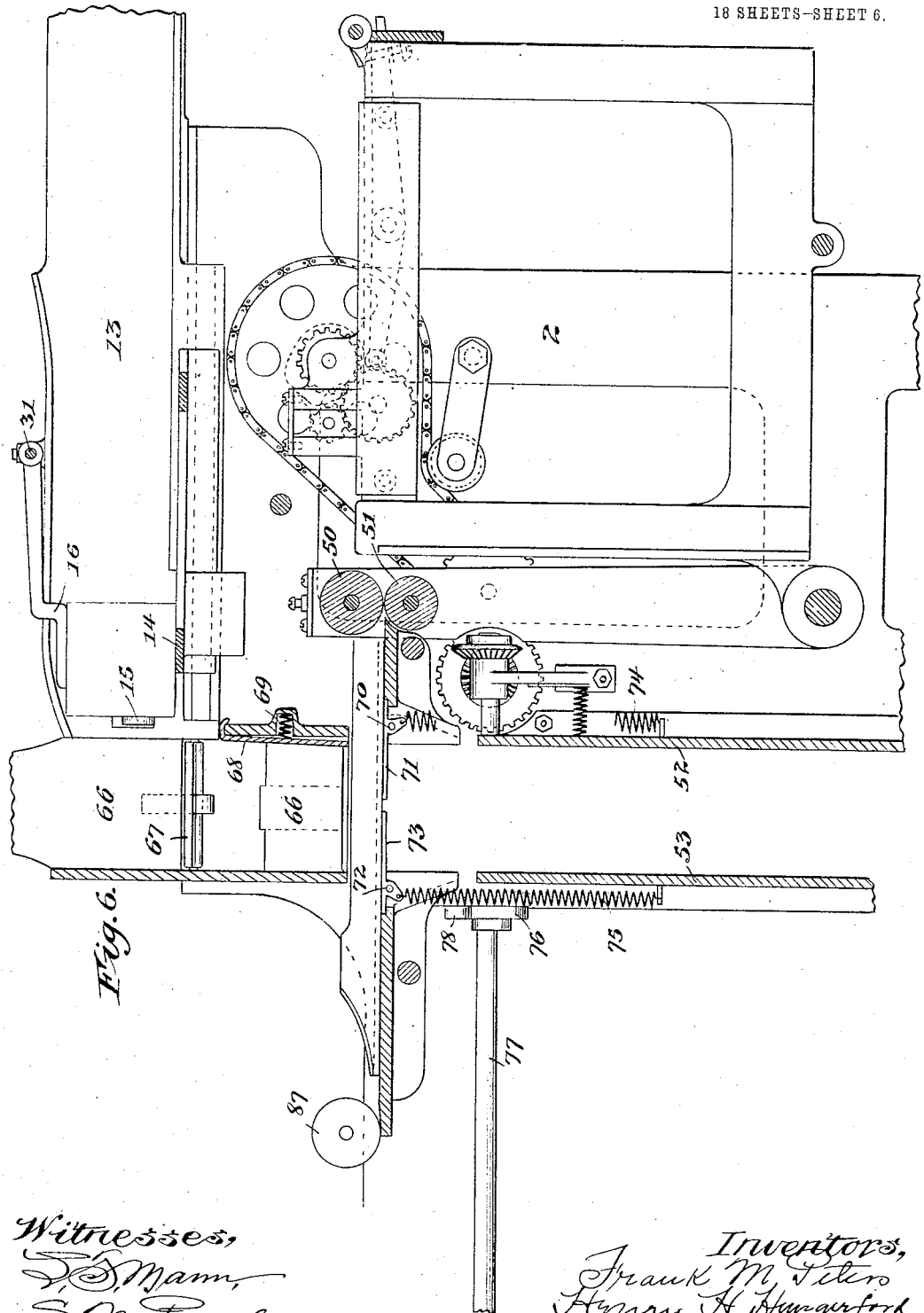

F. M. PETERS & H. H. HUNGERFORD.
MACHINE FOR WRAPPING PACKAGES.
APPLICATION FILED MAY 24, 1905.
1,043,863.
Patented Nov. 12, 1912.
18 SHEETS—SHEET 7.
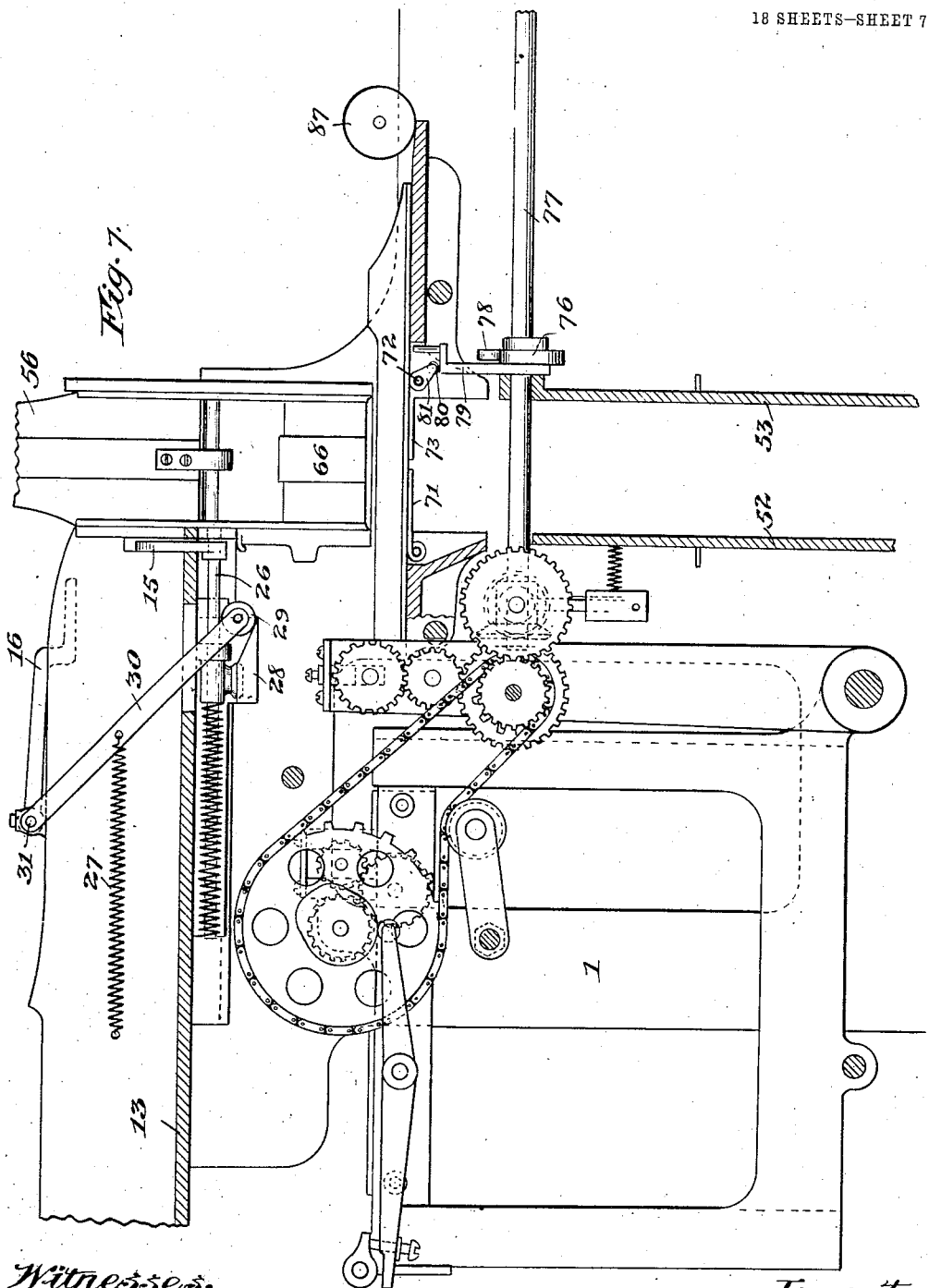

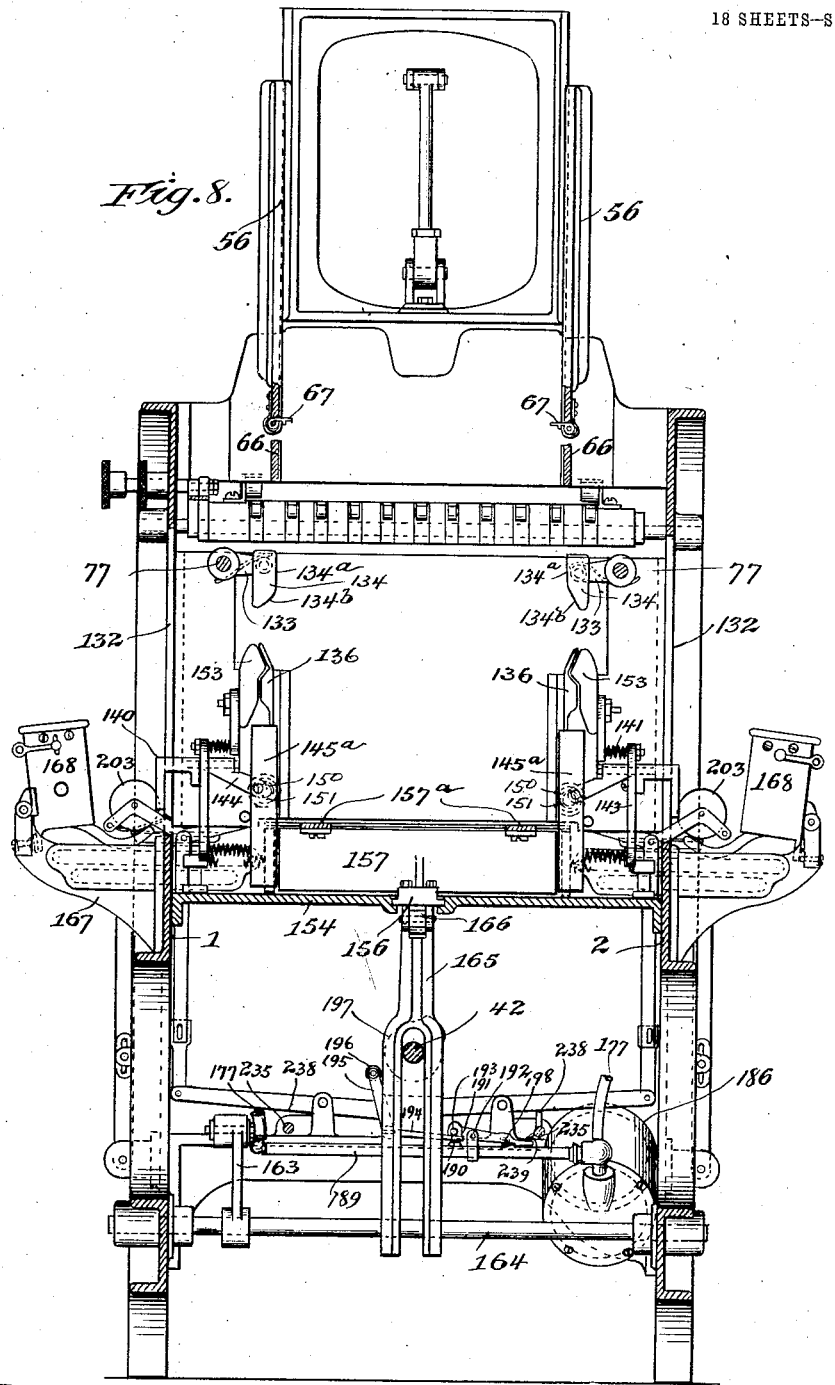

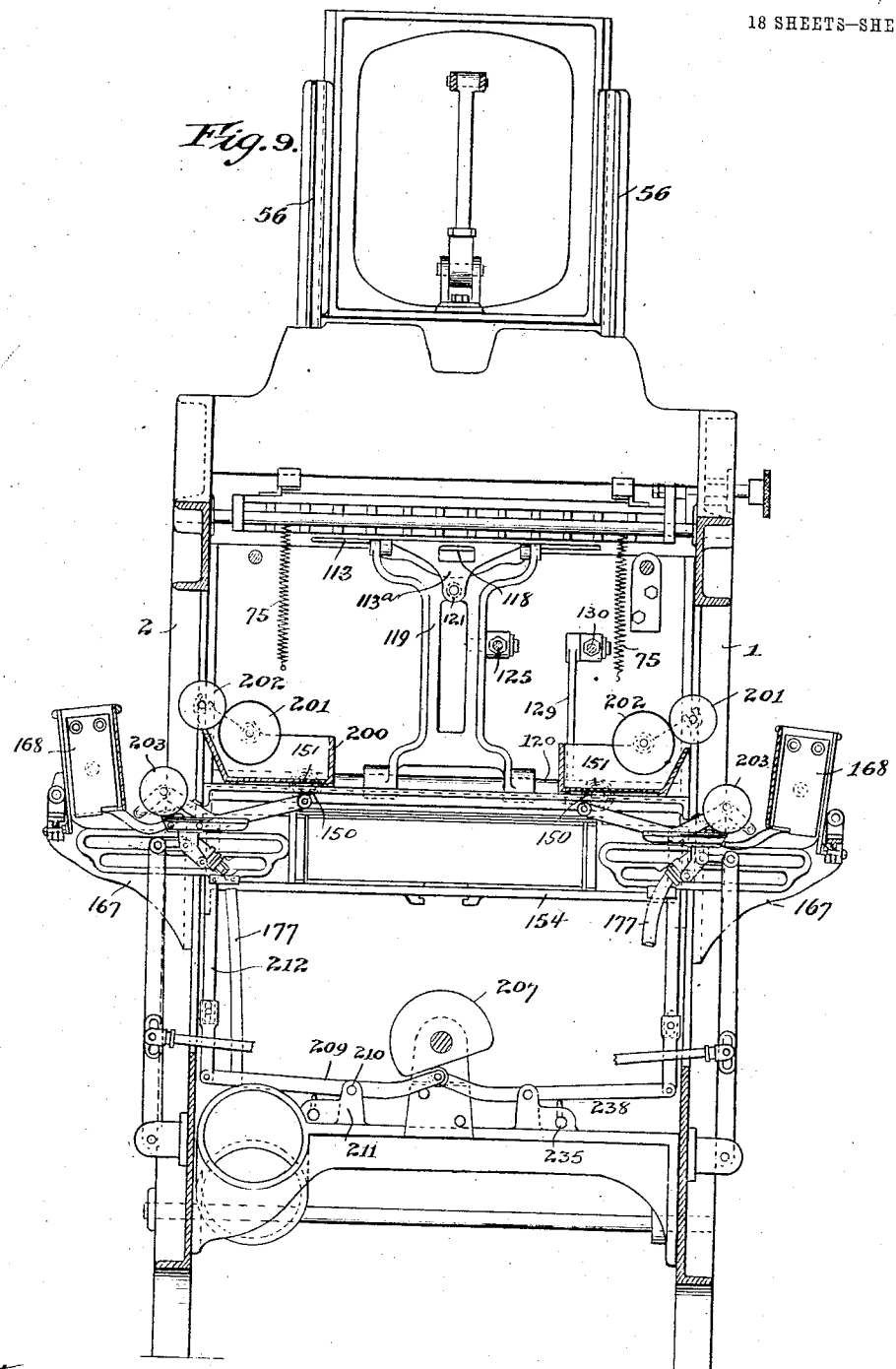

F. M. PETERS & H. H. HUNGERFORD.
MACHINE FOR WRAPPING PACKAGES.
APPLICATION FILED MAY 24, 1905.
1,043,863.
Patented Nov. 12, 1912.
18 SHEETS—SHEET 10.
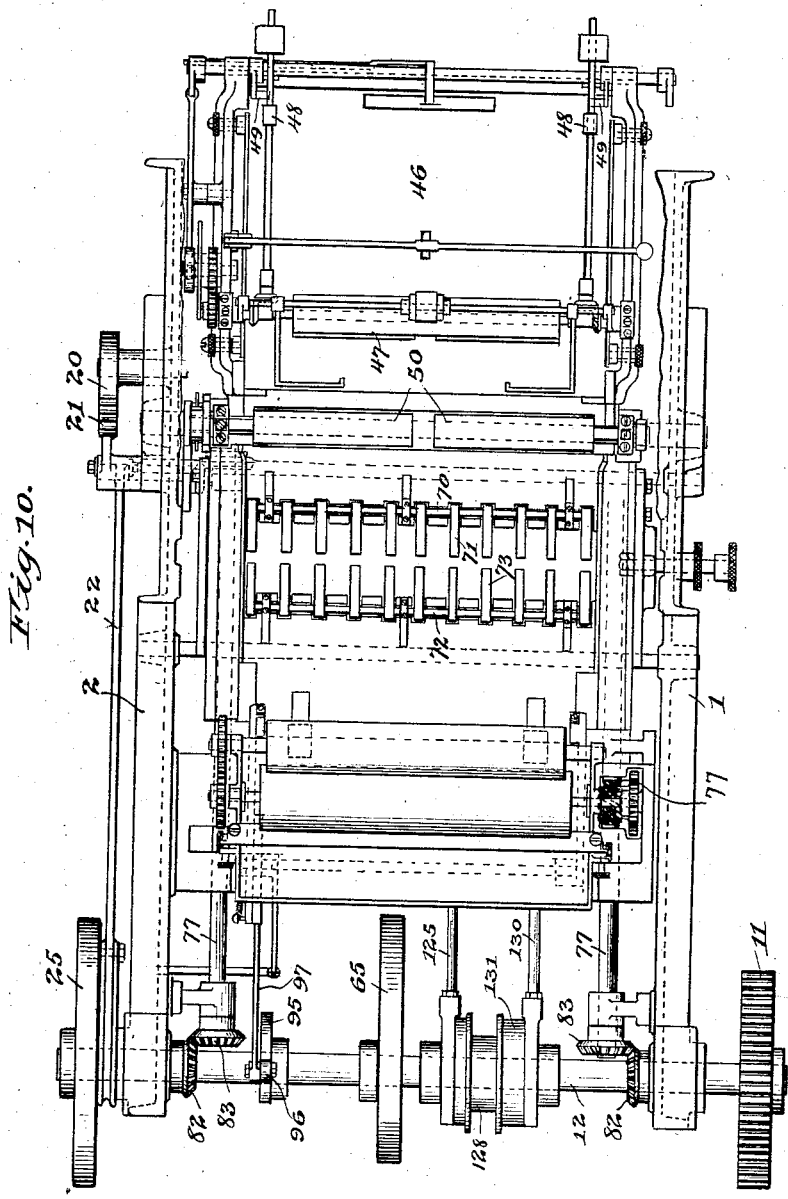

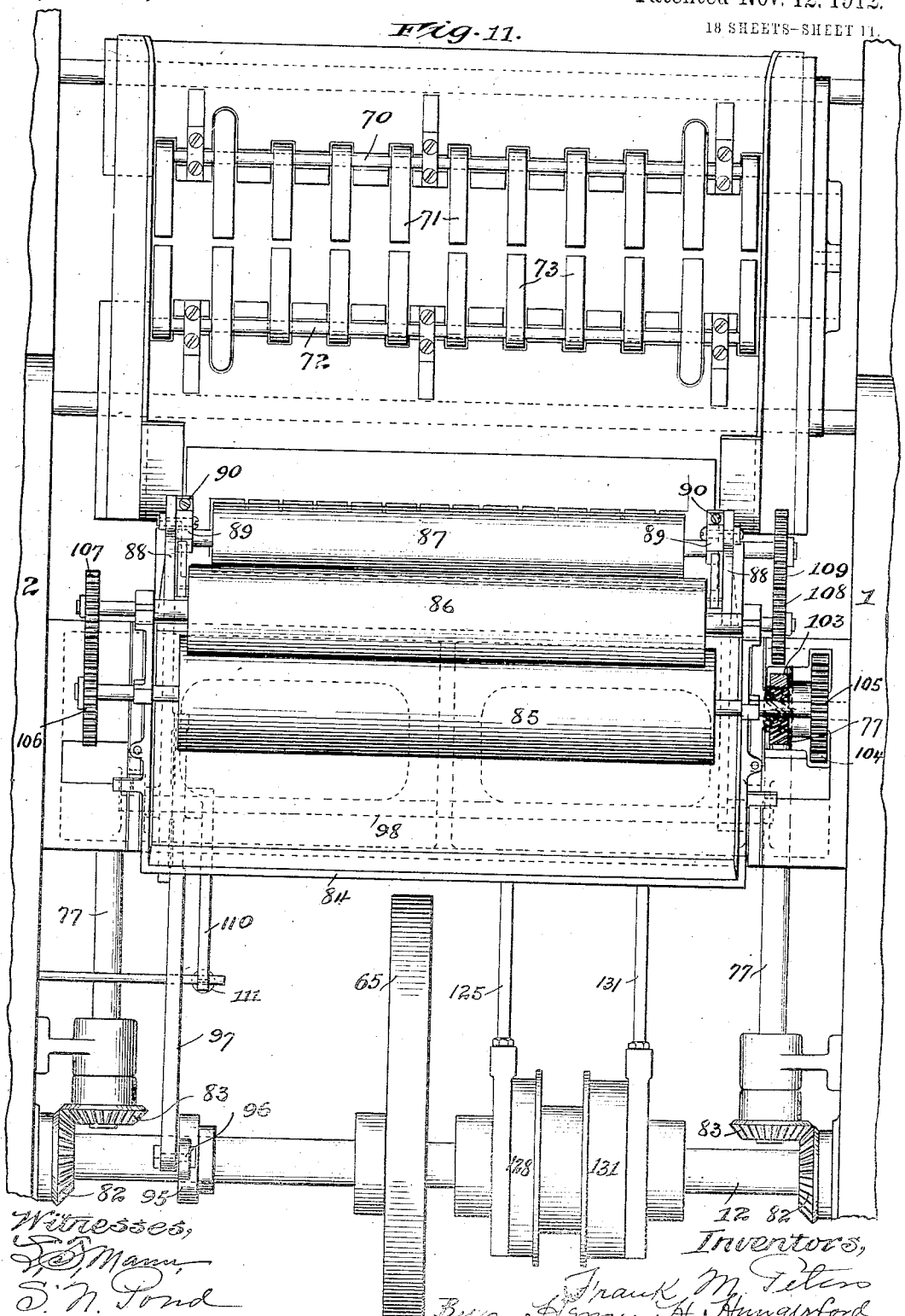

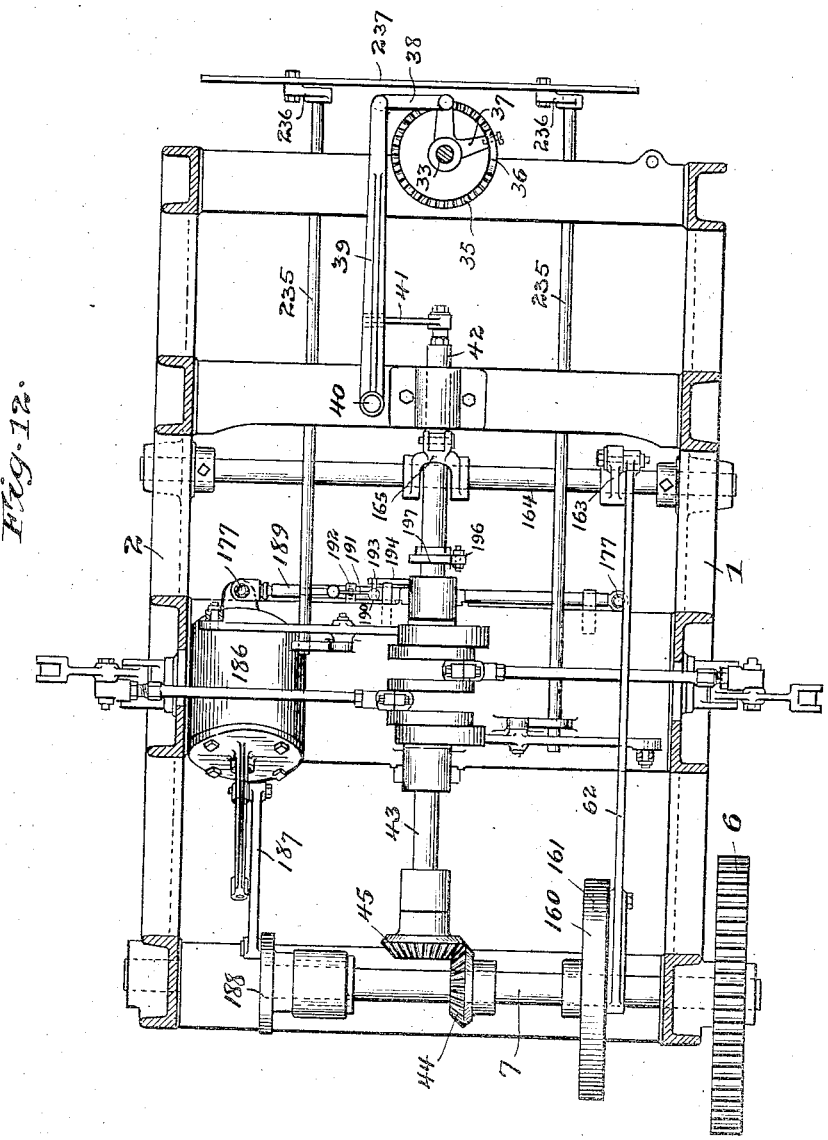

F. M. PETERS & H. H. HUNGERFORD.
MACHINE FOR WRAPPING PACKAGES.
APPLICATION FILED MAY 24, 1905.
1,043,863.
Patented Nov. 12, 1912.
18 SHEETS—SHEET 13.
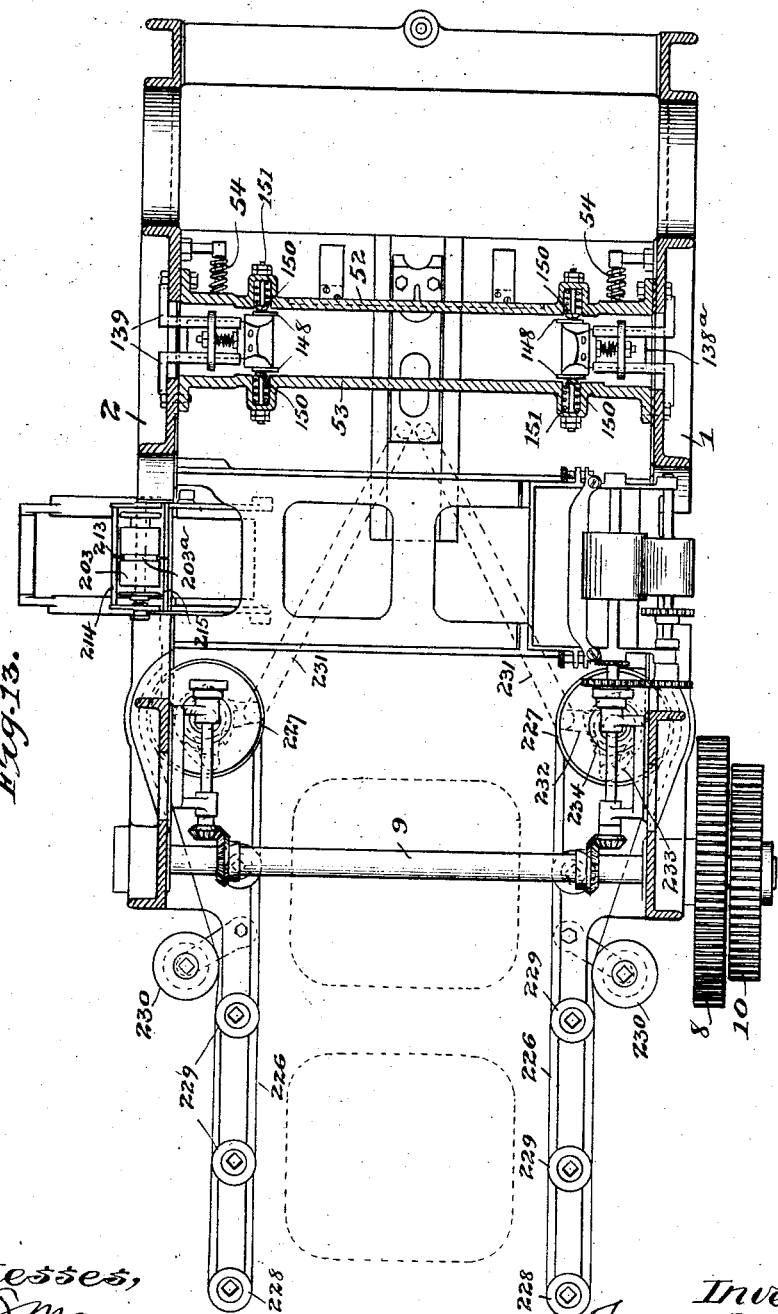

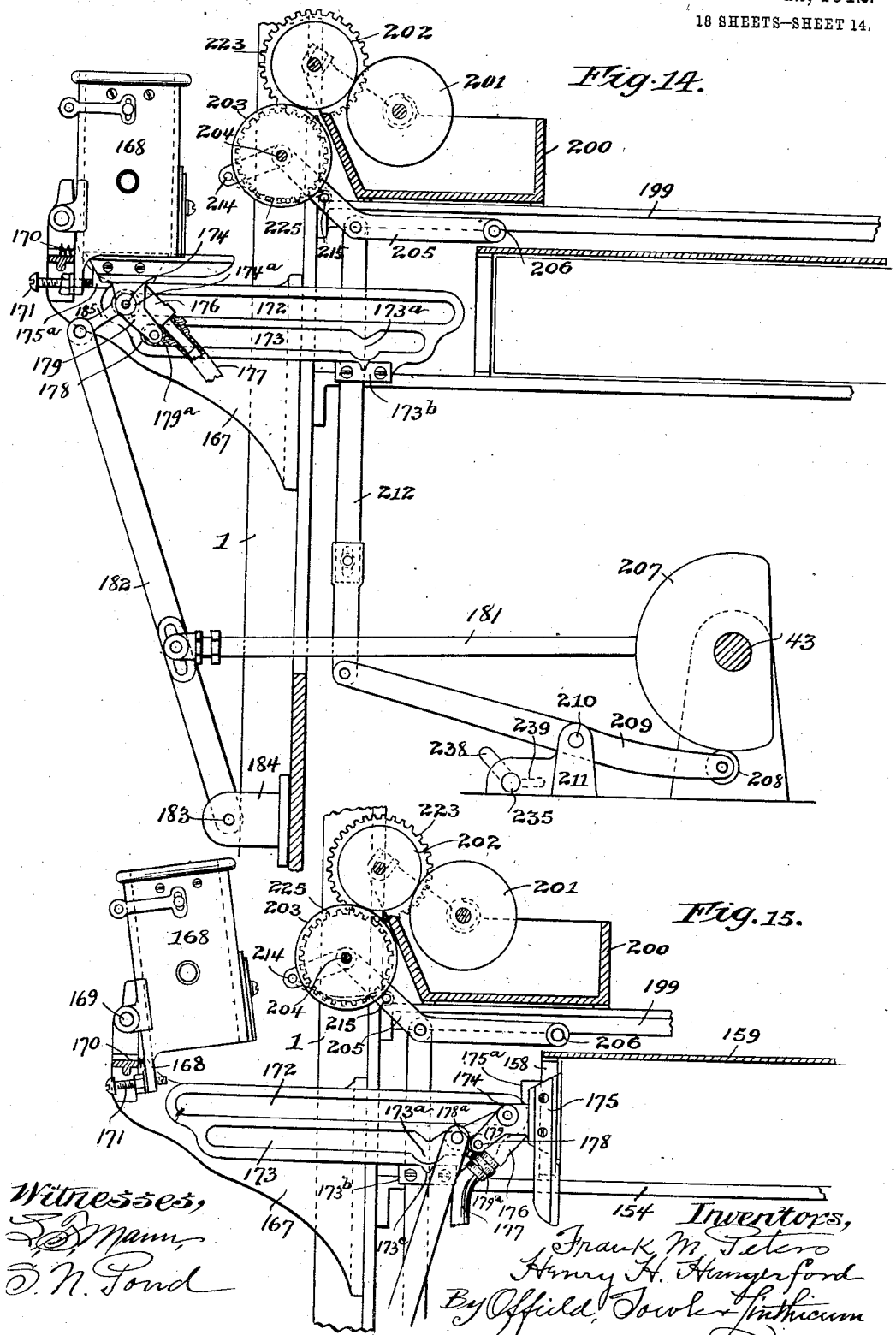

F. M. PETERS & H. H. HUNGERFORD.
MACHINE FOR WRAPPING PACKAGES.
APPLICATION FILED MAY 24, 1905.

1,043,863.

Patented Nov. 12, 1912.
18 SHEETS—SHEET 15.

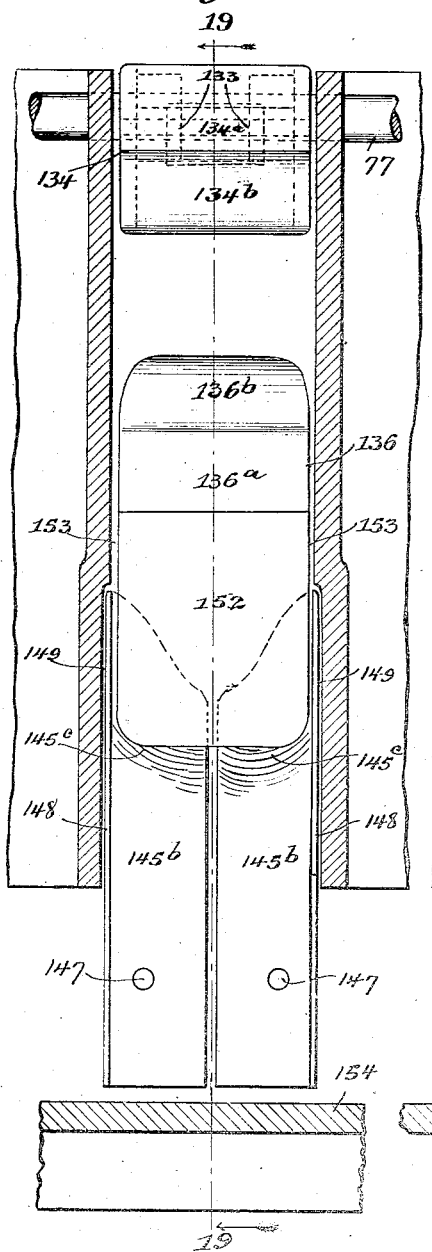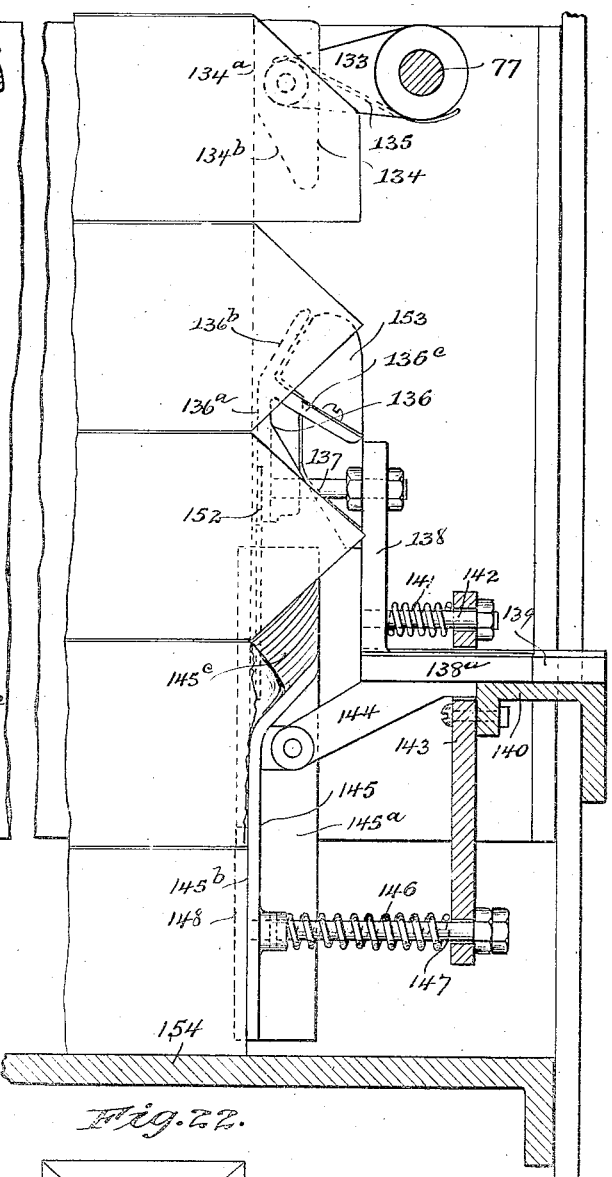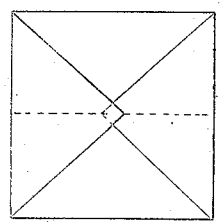

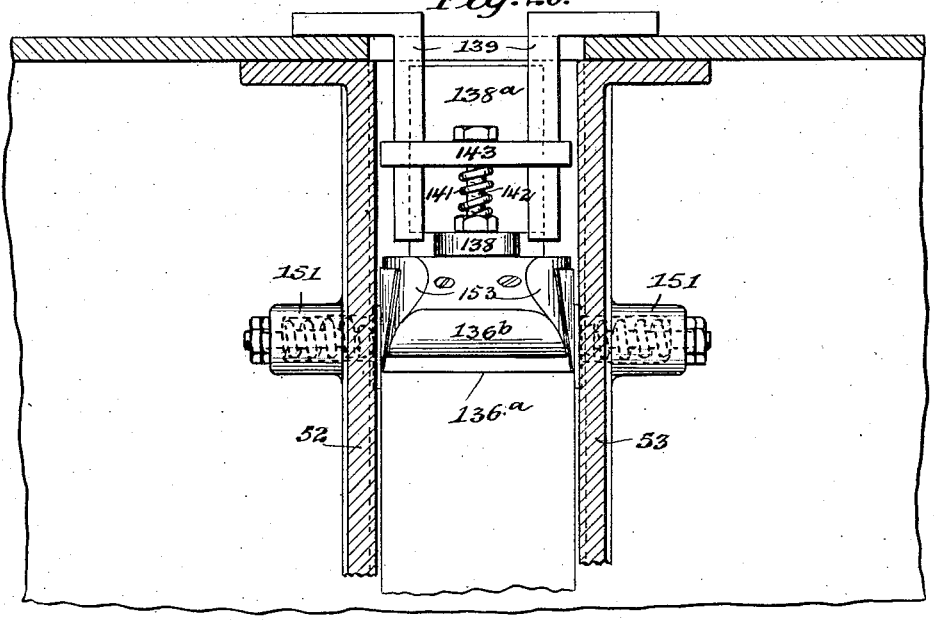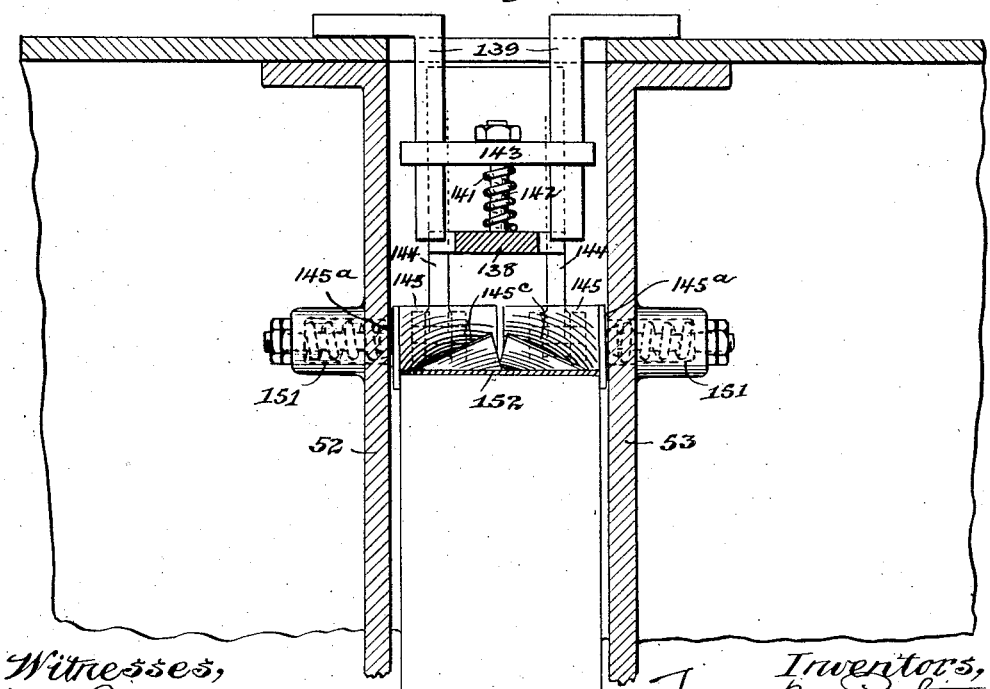

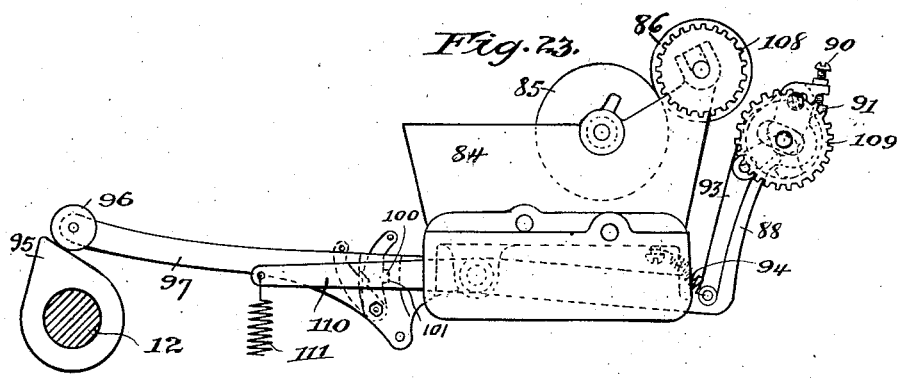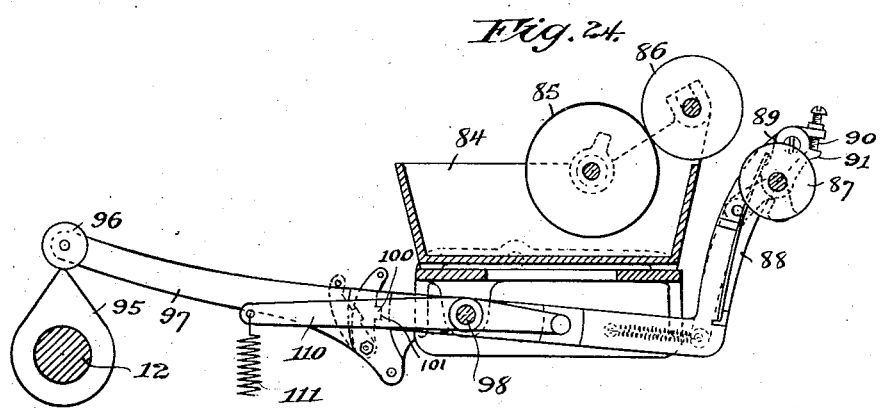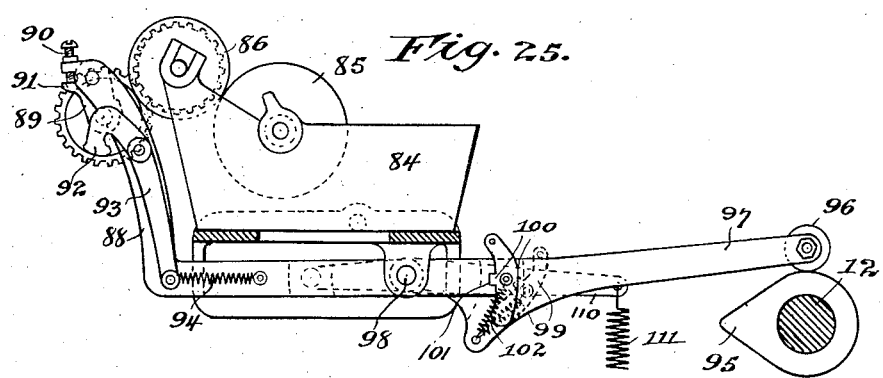

UNITED STATES PATENT OFFICE.

FRANK M. PETERS AND HENRY H. HUNGERFORD, OF CHICAGO, ILLINOIS; SAID HUNGERFORD ASSIGNOR TO SAID PETERS.

MACHINE FOR WRAPPING PACKAGES.

1,043,863.  Specification of Letters Patent.  Patented Nov. 12, 1912.

Application filed May 24, 1905. Serial No. 262,065.

*To all whom it may concern:*

Be it known that we, FRANK M. PETERS and HENRY H. HUNGERFORD, citizens of the United States, residing at Chicago, in the county of Cook and State of Illinois, have invented certain new and useful Improvements in Machines for Wrapping Packages, of which the following is a specification.

This invention relates to machines for applying to pasteboard and other boxes, packages, or cartons an outer wrapper of paper or like flexible material.

One object of the invention is to provide an improved automatic mechanism whereby boxes, cartons, or other packages may be wrapped, with a minimum of manual labor and at a rapid rate, thus insuring a reduction in the cost of these operations and in the cost of the package.

A further and more specific object of the invention is to provide a mechanism wherein the folding of the wrapper around the package may be performed with a minimum of moving parts of the machine, a distinctive feature of the present machine being the provision to a considerable extent of stationary folding means provided with parts that serve to produce and lay in proper order the end folds of the package.

To these and other ends the invention consists in certain novel features which we will now proceed to describe, and will then more particularly point out in the claims.

Our invention will be readily understood when considered in connection with the accompanying drawings, which illustrate the best mechanical embodiment thereof which we have as yet devised, and in which—

Figure 2:
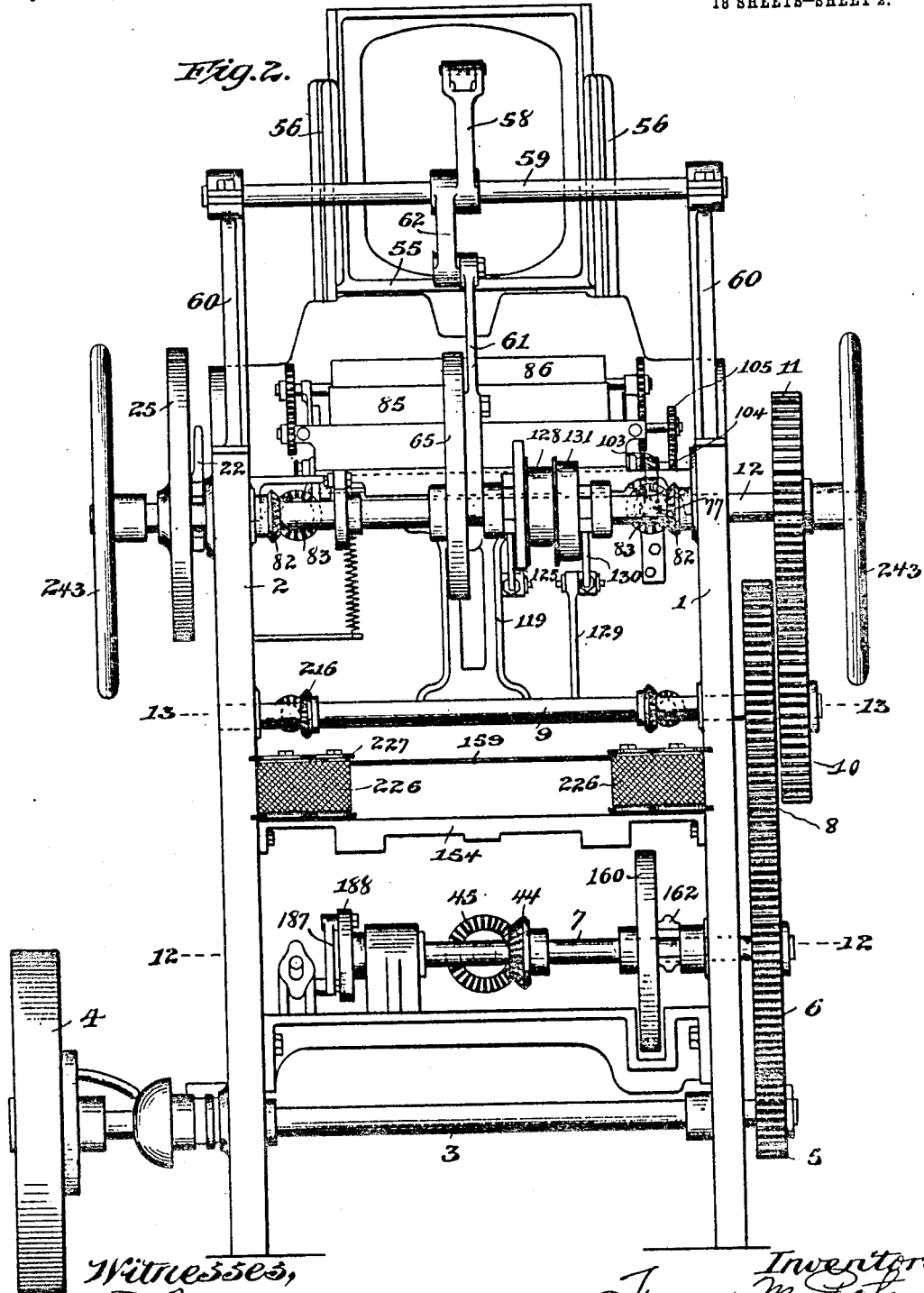
Figure 3:
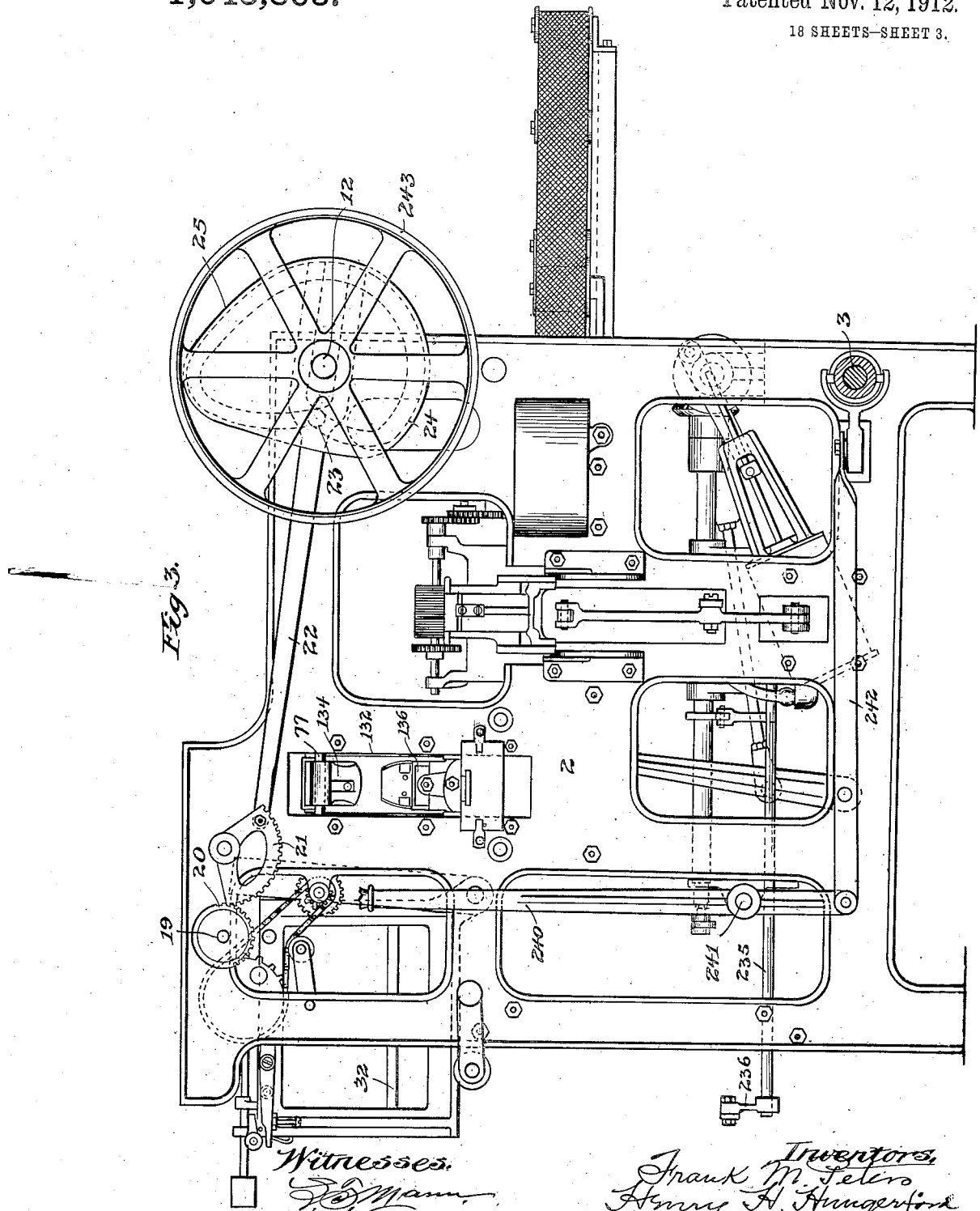
Figure 4:
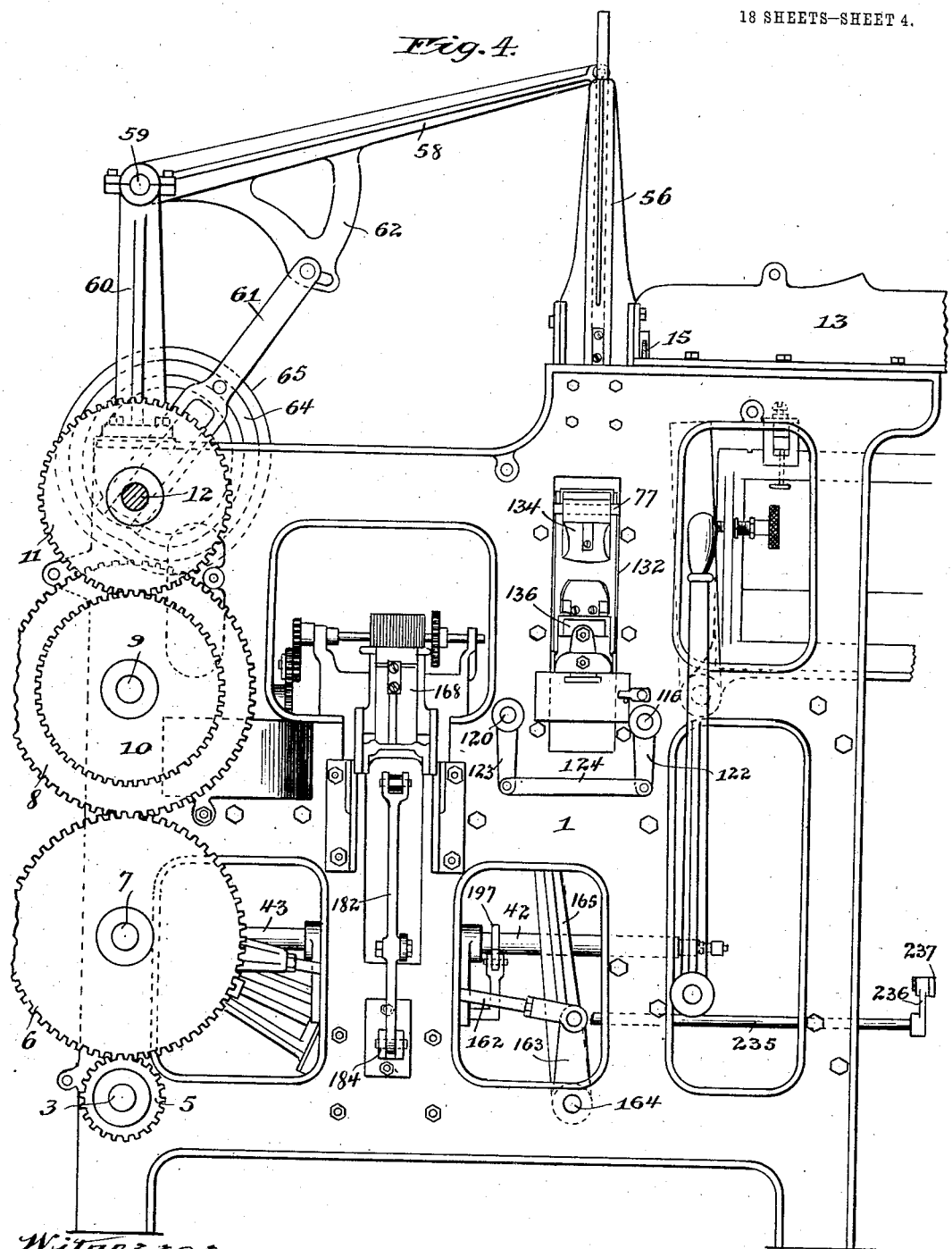
Figure 5:
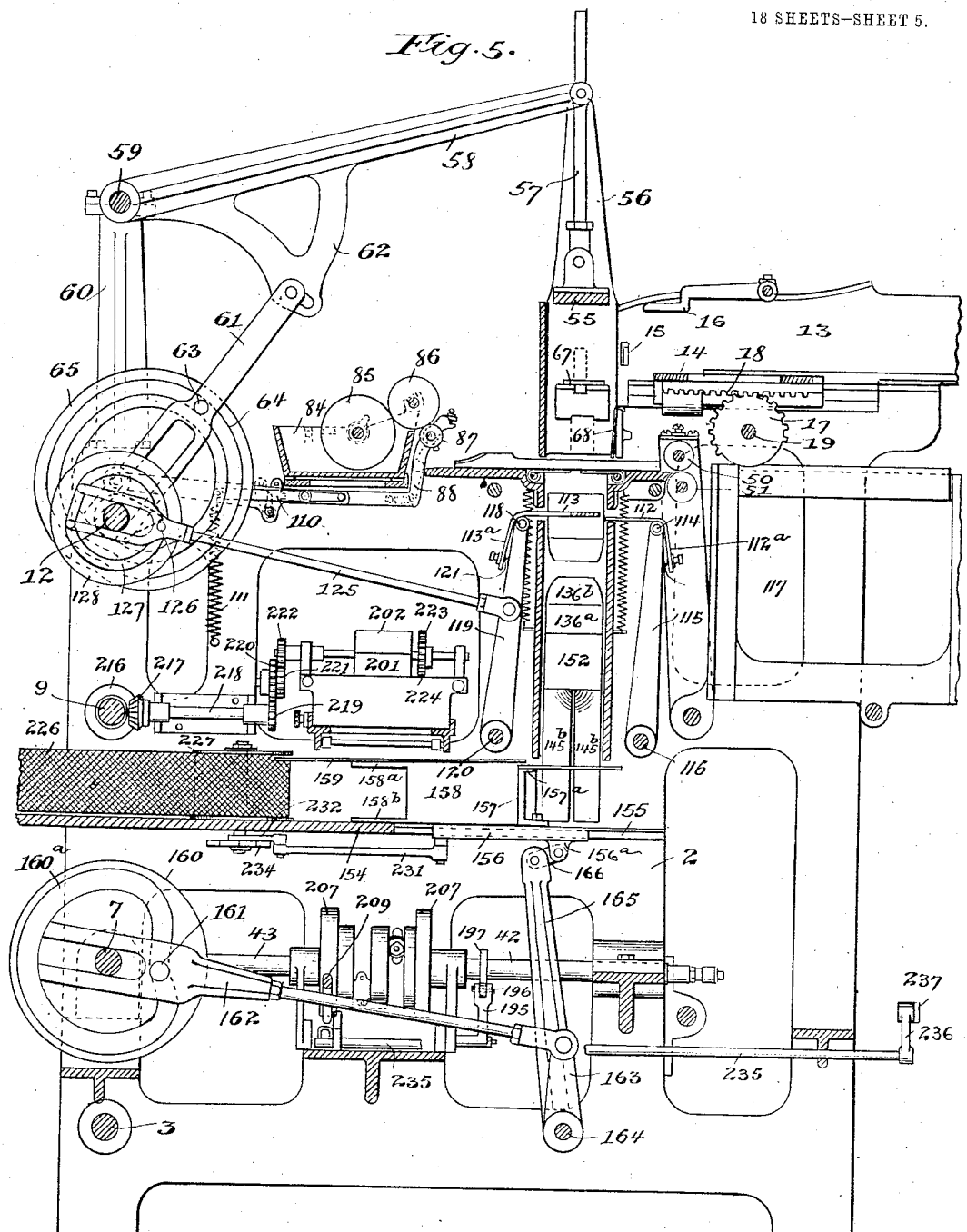
Figure 16:
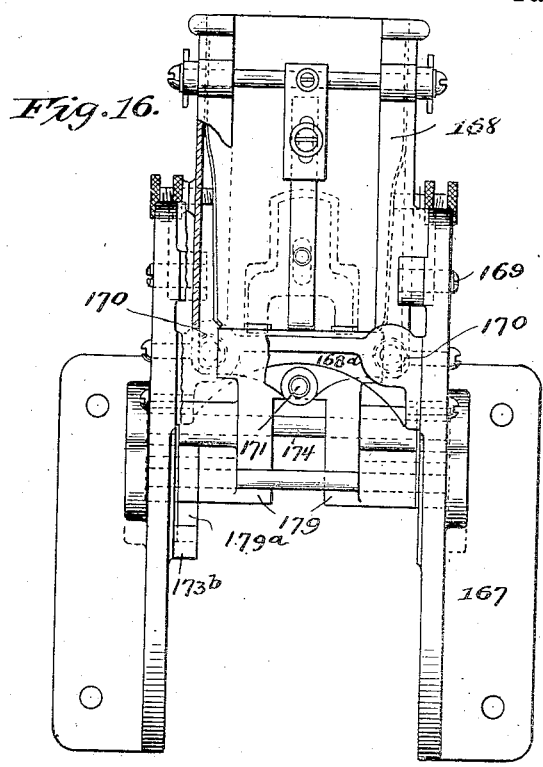
Figure 17:
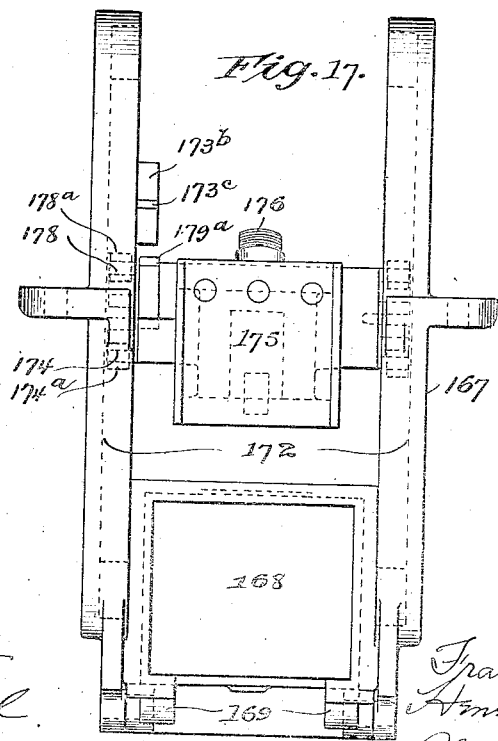

Figure 1 is an end elevational view of the receiving end of the machine; Fig. 2 is a similar view of the discharging end of the machine; Fig. 3 is a side elevational view; Fig. 4 is a view of the opposite side, partially broken away at the ends; Fig. 5 is a vertical sectional view longitudinally of the machine; Fig. 6 is an enlarged vertical sectional view longitudinally of the package and paper feeding mechanisms and the wrapping chute; Fig. 7 is a similar view to Fig. 6, in a different vertical plane and showing the mechanism from the opposite side; Fig. 8 is a vertical transverse section in the plane of the wrapping chute, looking toward the discharge end of the machine; Fig. 9 is a transverse sectional view in the plane of the sealing mechanism, looking toward the receiving end of the machine; Fig. 10 is a top plan view of the machine parts being removed and broken out for the sake of clearness; Fig. 11 is a top plan view on an enlarged scale, and somewhat more in detail, of the principal parts shown in Fig. 10; Fig. 12 is a horizontal sectional view taken substantially in the plane indicated by the dotted lines 12—12 on Fig. 2; Fig. 13 is a horizontal sectional view taken substantially on the line 13—13 of Fig. 2; Fig. 14 is an enlarged sectional elevation of the principal parts of the sealing mechanism, illustrating the seal-carrier in communication with the lower end of the seal hopper; Fig. 15 is a view similar to Fig. 14, but illustrating the other extreme position of the seal-carrier wherein it is applying a seal or label to the end of the package; Fig. 16 is a rear elevational view, partly in section, of one of the seal hoppers and the seal-carrier guide; Fig. 17 is a top plan view of Fig. 16; Fig. 18 is an enlarged transverse vertical sectional view through the package chute, showing the wrapper folding mechanisms in face elevation; Fig. 19 is a vertical sectional view in a plane at right angles to that of Fig. 18 on the line 19—19 of the latter figure; Fig. 20 is an enlarged horizontal sectional view through one end of the package chute; Fig. 21 is a view similar to Fig. 20 taken on a lower plane; Fig. 22 is an end view of a wrapped package, illustrating the end formation of the folded wrapper; Fig. 23 is a side elevational view of the mechanism employed for applying a strip of paste to one longitudinal edge of the wrapper; and Figs. 24 and 25 are vertical sectional views, viewed from opposite sides, through the pasting trough shown in Fig. 23 and more particularly illustrating the construction of the jointed lever carrying the pasting roller.

Before proceeding to a detailed description of the various parts and mechanisms of the machine as disclosed in the drawings, we will briefly outline in a general way the principal features of the machine and its mode of operation. The machine is of that general type which employs a vertical package chute with a package-depressing plunger operating therein, means for delivering the packages successively into the upper part of said chute, and means for delivering a wrapper across the path of each package preliminary to its depression by the plunger. Horizontal plates reciprocating across the chute above each package serve to form the top longitudinal folds of the wrapper; while devices located in the opposite ends of the chute, and constituting the principal novel elements of our present machine serve to effect the end folds of the wrapper. The top end fold is created by means of a rotating shoe that is caused to wipe downwardly over the upper portion of the end of the package; while the two lateral end folds and the bottom end fold are created by means of a folder of special formation held substantially stationary except for a slight resilient yielding capability to enable it to adjust itself to the end of the package as the latter passes thereover. From the bottom of the package chute, at which point the wrapper has been fully applied and folded, the package is advanced horizontally into the field of action of the sealing mechanism located opposite each end, where a pair of seal-carriers traveling horizontally toward and from the sides of the machine operate to withdraw from a suitable box or holder labels or other seals, and, submitting the latter to an application of paste while traveling toward the ends of the package, apply such seals or labels to the latter in succession, whence the wrapped and sealed packages are withdrawn from the machine and discharged by a suitable conveying mechanism which engages the packages at their ends for a sufficient interval of time to enable the seals to fully adhere to the ends of the wrapper packages.

In the drawings, the main frame, which supports the various mechanisms of which the apparatus is composed, is shown as constructed essentially of a pair of parallel vertical side-frame members 1 and 2, suitably connected and rigidly spaced. Journaled in and between the lower portions of said side-frames at the discharging end of the machine is the main driving shaft of the apparatus, designated by 3, to which power is supplied through a suitable clutch-controlled pulley 4 (Fig. 2). On the end of said shaft overhanging the side-frame 1 is a pinion 5, which meshes with and drives a gear 6 on a superposed transverse shaft 7 (Fig. 2). The gear 6 in turn meshes with and drives a gear 8 on a superposed transverse shaft 9, which latter shaft carries, outside the gear 8, a smaller gear 10 meshing with and driving a gear 11 on an upper shaft 12 journaled in and transversely of the side-frame members 1 and 2. From the several transverse shafts 3, 7, 9 and 12, power is taken through connections hereinafter described for actuating the various movable elements of the several mechanisms.

At the upper portion of the receiving end of the machine is located the package feed mechanism; and immediately beneath the same the wrapper feed mechanism. The package feed is substantially identical with that disclosed in Letters Patent No. 790,454 granted to us on the 23rd day of May, 1905, to which reference may be had for a complete description thereof. This mechanism, which is most fully shown in Figs. 5, 6 and 7, comprises as its principal elements a horizontal chute 13 along which the packages are fed in sidewise juxtaposition, the delivery of the packages into the chute being effected by a follower 14, and controlled by lateral stop-fingers 15 and an overhanging stop-finger 16. The follower 14 is reciprocated by means of an oscillating pinion 17 engaging a rack 18 (Fig. 5) on its under side, the shaft 19 on which the pinion 17 is mounted being actuated on one side of the machine by the means shown in Fig. 3, wherein 20 is a pinion on the end of shaft 19 engaged by a sector gear 21 that is oscillated by a connecting rod 22 at its rear end straddling the shaft 12 and having a roller 23 playing in a cam-groove 24 formed in the inner face of the cam 25 fast on shaft 12. The lateral stop-fingers 15 are mounted on horizontal shafts 26 that are oscillated by means connected with the follower 14, such means being fully disclosed in the Patent No. 790,454, above referred to. The overhanging stop-finger 16 is normally drawn downwardly by a spring 27 (Fig. 7), and is raised at the proper intervals to permit the advance of the foremost package by means of an inclined shoe 28 moving beneath a roller 29 on the lower end of an arm 30 connected to the shaft 31 on which said finger is mounted.

The wrapper feed mechanism herein shown, which directly underlies the package feed mechanism above described is identical with that shown and described in our Letters Patent No. 702,673, granted to us June 17, 1902, to which reference may be had for a complete description thereof. The principal features of this mechanism consist of the following. 32 (Fig. 1) is a table or platform mounted on the upper end of the screw-threaded rod 33 supported in a vertical bearing 34 and provided with an actuating ratchet ring 35 on its lower end. This latter is given a slow intermittent rotation by means of a pawl 36 carried on one arm of the bell-crank lever 37 (Fig. 12), the other arm of which is connected by a link 38 with an arm 39 pivoted at 40 to a cross-member of the frame, said arm 39 being given a slight oscillation by means of a link 41 pivoted thereto at one end and at its other end encircling an eccentric on a longitudinal rotary shaft 42 that constitutes an extension of a centrally disposed longitudinal shaft 43 that is geared to and driven from the shaft 7 by means of bevel-gears 44 and 45. On the table 32 is laid a stack of wrappers, the topmost one of which appears at 46 in the plan view, Fig. 10. The topmost wrapper is selected and advanced into the machine by a group of devices including a friction roll 47, separating fingers 48, clamping and releasing fingers 49, a pair of feeding-in rolls 50 and 51, and other minor auxiliary devices, all of which, together with the means for actuating them, will be found fully described in our former Patent, No. 702,673, above referred to.

Secured to and disposed between the side-frame members 1 and 2 directly in advance of the package and wrapper feed mechanisms are a pair of parallel transverse plates 52 and 53 (Fig. 13) which constitute the lower portions of the vertical side walls of the package chute. The wall 53 is stationary, while the companion wall 52 is so mounted as to be capable of a slight lateral yielding movement, being elastically backed by springs 54 bearing against the rear surface thereof. A plunger 55 (Figs. 2 and 5) suitably guided in vertical grooved standards 56 reciprocates in said chute, said plunger being hung by a pitman 57 from the end of an arm 58 mounted on a transverse rod 59 rotatably supported in the upper ends of a pair of posts 60 surmounting the side frames 1 and 2, said arm being oscillated by means of a connecting rod 61 pivoted to a bracket 62 on the under side of said arm, said rod having a forked end straddling the shaft 12 and carrying a roller 63 engaging a cam-groove 64 in the face of a cam 65 fast on the shaft 12 substantially centrally thereof. The package chute has end walls 66 (Fig. 8) that extend down substantially to the plane of the wrapper feed mechanism; and projecting inwardly of said end walls are spring fingers 67 (Figs. 5, 6 and 8) which serve to support the ends of the package when it is first introduced to the upper end of the chute. In the rear wall of the chute directly beneath the package feed chute is located a plate 68 suspended at its upper end and elastically backed by a spring 69, the function of said plate being to exert a sufficient lateral pressure upon the package at that point to prevent it by friction from dropping away from the face of the plunger in the descending movement of the latter. Horizontally opposite the wrapper feed rolls 50 and 51 are located a pair of inwardly projecting wrapper guides. One of these guides is mounted in the outer wall of the chute and comprises, as best shown in the detail view, Fig. 11, a horizontal shaft 70 on which are a series of inwardly projecting fingers 71, while the other guide is mounted directly opposite in the inner wall of the chute, and comprises a shaft 72 having inwardly projecting fingers 73. As will be seen by reference to Fig. 6, the fingers 71 and 73 are normally maintained horizontal by tension springs 74 and 75 exerting a downward pull on said guides in rear of their pivotal axes. The function of these guides is primarily to bridge over the opening of the chute and constitute a guide and support for the wrapper when the latter is introduced across the chute.

Incidentally the fingers of the guides coöperate to effect the laying of the wrapper snugly against the bottom and side walls of the package as the latter and the wrapper are forced downwardly into the chute by the plunger. As the package and wrapper descend below the plane of the fingers, the latter bend the sides of the wrapper up smoothly against the sides of the package with a resilient or yielding pressure uniformly distributed over the sides of the package. As soon as the package clears the free edge of the fingers 71, the latter at once return to horizontal position following the upward movement of the plunger. The return of the other guide is slightly delayed by means of a cam 76 (Figs. 6 and 7) on a rotating shaft 77, said shaft engaging a roller 78 carried by a vertically slidable bar 79, the upper end of which latter engages a roller 80 carried in the free end of an arm 81 fast on the shaft 72. The cam 76 is so set that it will maintain the supporting bar 79 elevated (in which position the guide is vertical) for a sufficient length of time after the package has passed the lower end of said guide to enable the plunger to rise beyond the pasted edge of the wrapper. The purpose of this is to prevent smearing the end of the plunger on its return movement with paste that is applied, by means hereinafter described, to the upper edge of the wrapper that is bent inwardly by the return movement of the fingers 73. The shaft 77, which serves to transmit power and motion to the wrapper feed and several other mechanisms, hereinafter described, is one of a pair of shafts extending longitudinally of either side of the machine, being driven from the transverse shaft 12 by intermeshing bevel gears 82 and 83.

After the wrapper has been introduced to package-receiving position, the upper side of the inner longitudinal margin of the wrapper is given an application of paste by the following means. Referring to Figs. 5, 11, and the detail views, Figs. 23, 24 and 25, 84 designates a paste-trough carrying a roll 85 serving to pick up the paste and apply the same to the surface of a roll 86 running in contact therewith, from which latter roll the paste is taken by a roll 87 carried by and between a pair of bent arms 88. The roll 87 is journaled in the lower ends of a pair of hangers 89 that are pivotally suspended from the upper ends of the upwardly bent arms 88; and the outward swing of said hangers is regulated by adjustable stops in the nature of screws 90 carried by the projecting ends of the arms 88 and contacting stop lugs 91 on the hangers 89. Said arms 88 also carry pivoted bent clamping fingers 92, the function of the latter being to engage and clamp the corners of the wrapper while the roll 87 wipes over the margin of the latter, applying the paste thereto. For this purpose the fingers 92 have rearwardly and downwardly extending arms 93 that are drawn rearwardly by tension springs 94, thus normally tending to force the fingers 92 into clamping engagement with the wrapper. The paste-applying roll 87 is actuated in its movement to and fro between the paste-distributing roll 86 and the margin of the wrapper by means of a pointed cam 95 on the shaft 12 that is engaged by a roller 96 on the rear end of an arm 97, which arm is pivoted at its opposite end on a shaft 98, carried by the trough support. Said arm 97 carries a spring-actuated pivoted dog 99, said dog having a tooth 100 adapted to be thrown into and out of engagement with a notch 101 in the inner end of one of the bent arms 88; said dog also having a controlling spring 102 so connected thereto as to hold said dog in either engaged or disengaged position. When said dog is in engaged position, as shown by full lines, the actuating arm 97 is rigid with the roller-carrying arms 88 and operates the latter and the roller from the cam 95. When it is desired to throw the pasting roll out of operation, as when discharging from the machine the final packages of a run, by turning the dog 99 out of operative position, the cam 95 operates idly and without actuating the paste roll. In the normal operation of the parts, however, said paste roll 87 is carried down into contact with the margin of each wrapper as fast as the latter are introduced to package-receiving position across the chute.

The paste rolls are driven from one of the shafts 77 by means of a worm (not shown) on said shaft driving a worm-wheel 103 (Figs. 2 and 11), the shaft of which latter carries a gear 104 meshing with and driving a superposed gear 105 on the shaft of the roll 85. This same shaft carries at its opposite end a gear 106 that meshes with and drives a gear 107 on the shaft of the roll 86. The opposite end of the shaft of roll 86 carries a gear 108 that is adapted to be engaged by a driving gear 109 on the same end of the spindle of the pasting roll 87. In this way the distributing roll 86 is kept constantly and uniformly supplied with paste, and the roll 87 receives its supply of paste therefrom on each return movement through the connection of the gears 108 and 109 causing the roll 87 to rotate in contact with roll 86 on each return movement. 110 (Figs. 23, 24 and 25) designates an arm fast on shaft 98 and controlled by a tension spring 111 in such a manner as to oppose the action of the cam 95 and maintain the roller 96 constantly engaged therewith.

Describing next those parts which effect the folding over of the top longitudinal flaps or folds of the wrapper, these operations are performed by a pair of blades that are caused to reciprocate inwardly and outwardly of the side walls of the chute directly over the upper side of the package. This mechanism is best shown in Figs. 4, 5 and 9, wherein 112 designates one of said blades and 113 the other. The blade 112, the horizontal portion of which is slightly narrower than that of the blade 113, is mounted on a horizontal rod 114 that is carried by the upper end of a vertical arm 115 that is fast on an oscillatory cross-shaft 116 extending between the side-frame members of the machine. The blade 112 is elastically supported by means of a depending tail-piece $112^a$, normally pressed outwardly by a compression spring 117. The blade 113 is similarly supported on a horizontal rod 118 carried in the upper end of an arm 119, which latter is loosely mounted at its lower end on an oscillatory shaft 120. The blade 113 is elastically supported in the same way as the blade 112, by means of a tail-piece $113^a$ elastically forced outwardly by means of a compression spring 121. The shaft 116 is connected so as to oscillate from and in unison with the shaft 120 by the means shown in Fig. 4, consisting of a pair of depending arms 122 and 123 fast on said shafts 116 and 120, respectively, said arms being connected by a link 124. The arm 119 is oscillated by means of a connecting rod 125 (Fig. 5) having a forked end straddling the shaft 12 and a roller 126 engaging a cam-groove 127 in the face of a cam 128 carried by said shaft 12. The shaft 120 is oscillated independently of the shaft 120 through an arm 129 (Fig. 9) fast on said shaft, to the upper end of which is pivoted the inner end of a connecting rod 130 similar to the connecting rod 125, said rod 130 being similarly engaged and driven by a companion cam 131 on the shaft 12, as shown in Figs. 2, 10 and 11. The cams are so timed as to cause the blade 112 to enter the chute first, folding down the narrower top flap, while the companion blade 113 enters later, folding down on top thereof the outer pasted flap.

Referring next to the means whereby the ends of the wrapper are creased and folded down in such a way as to produce a double-pointed fold, the mechanism of which constitutes a leading and most important novel part of our invention, the means for bending down the top vertical fold is in the nature of a rotating flat-bottomed shoe, spring-held on its shaft so as to yield and engage the flap through its full extent in pressing the latter down so as to sharply define the vertical end creases of the flap. The other three folds are effected by means of a stationary folder which serves to first turn up the bottom vertical flap, and then fold inwardly over said top and bottom vertical flaps the two opposite side flaps, thus producing a double-pointed fold. Referring to the drawings, and particularly Figs. 3, 4, 8, 13, and 18 to 21, 132 designates vertical openings in the side-frame members registering with the open ends of the lower portion of the package chute. Mounted on the shafts 77 which extend across the upper portion of said end openings are inwardly extending arms 133 (Figs. 8, 18 and 19) on and between which arms is pivotally supported a shoe 134. The operative faces of said shoe are formed with a straight flat portion 134$^a$, and a beveled or inclined advance portion 134$^b$; and the shoe is held with capacity for a limited resilient pivotal movement by means of a spring 135. As each package is forced downwardly into a horizontal plane opposite these shoes, the latter on reaching the limit of their inward movement in turning about the axes of shafts 77 engage the upper end portion of the wrappers at first with the inclined surface 134$^b$, gradually pressing said ends downwardly until the latter are engaged by the substantially vertical faces 134$^a$ whereby they are pressed firmly against the end of the box, thus making sharply defined bends at the upper transverse edge of the package, and sharply defined vertical bends at the sides of the downwardly folded portion. The elastic pivotal yielding capacity of the shoe enables it to adjust itself perfectly to the end of the package; the sole function of this rotating shoe being to form the upper depending flap of the end fold.

Directly beneath the rotating shoes last described are located the stationary folders which serve to form the bottom and side flaps of the end fold. The package-engaging parts of this folder consist essentially of an upper plate having a flat rectangular vertical surface with an outwardly bent upper lip, and a pair of underlying bars disposed vertically side by side and provided on their inner sides with warped surfaces. Describing this folder more particularly, 136 designates a plate having an inner plain rectangular vertical face 136$^a$, an outwardly and upwardly inclined lip 136$^b$ at its upper end, and a downwardly and outwardly inclined rib 136$^c$ on its back. This plate is supported on the inner end of a horizontal rod 137 adjustably mounted in the upper end of a bracket 138, which bracket has a lower horizontal base 138$^a$ that engages a grooved guide-way 139 mounted on a rigid transverse support 140. The bracket 138 is elastically backed by a coil spring 141 surrounding a rod 142 mounted therein, the outer end of said rod passing through an aperture in the upper end of a vertical abutment plate 143 rigidly secured to the support 140, said abutment plate resisting the thrust of the spring 141 and serving to maintain the plate 136 pressed inwardly. Carried by a pair of inwardly and downwardly inclined arms 144 that are fast with the bracket 138 are a pair of symmetrically formed and inversely disposed bars 145. Each of these bars has a side wall 145$^a$ extending the full length thereof in a plane parallel to the side walls of the chute, and a transverse or face wall 145$^b$ at right angles thereto, which face wall is twisted through its upper portion rearwardly into the plane of the side wall, thereby forming the warped surface 145$^c$, indicated by the shaded portions in Figs. 18, 19 and 21. As will be seen by reference to Fig. 18, these warped surfaces are inversely disposed, their upper ends lying in the planes of the side walls of the bars, the full width of the shoe apart, and their inner ends approximately meeting in the plane of the face walls at substantially the transverse center of the chute. The bars 145 are pivotally supported on the arms 144, and are elastically backed near their lower ends by coil springs 146 supported on rods 147 carried by said bars, the outer ends of said rods playing in apertures formed in the lower end of the abutment plate 143, which latter also serve to resist the thrust of the springs 146. The side walls 145$^a$ of the two bars are projected inwardly of the transverse faces 145$^b$ for a slight distance, as shown at 148, the inner faces of the side walls of the chute being slightly recessed, as shown at 149 in Fig. 18 to accommodate said side walls and bring the inner faces of the projections 148 flush with the planes of the inner surfaces of the walls of the chute. The function of the marginal projections 148 is to slightly lap over the ends of the side walls of the package and define a sharp bend in the wrapper at the intersection of the side and end walls. To assist in this function we provide means for elastically pressing the bars 145 toward each other, such means, as best shown in Fig. 13, comprising spring-pressed plungers 150 housed in pockets 151 formed in the side walls 52 and 52 of the chute, said plungers pressing directly against the side walls of the bars, and thus maintaining the flanges or projections 148 snugly compressed against the sides of the package as the latter descends between them. In and flush with the vertical face 136ᵃ of the plate 136 is set a sheet metal apron 152 which extends downwardly in front of the warped surfaces of the bars 145 nearly to the lower end of said warped surfaces. Secured to the rib 136ᶜ are a pair of bent metal shields 153, which substantially inclose the sides of the upper member 136 of the folder, said shields being elastic and at their lower portions lying close to the side walls of the chute; the function of said shields being to guide the side flaps down alongside the upper member 136 of the folder and compress them so as to sharply define the inclined folds therein before said flaps pass into the field of action of the warped surfaces, by which latter they are gradually turned inwardly upon the end of the package.

From the foregoing it will be seen that as the package descends the lower horizontal end projection of the wrapper will be engaged and bent upwardly by the lip 136ᵇ, and will subsequently be pressed flat against the end wall of the package by the vertical surface 136ᵃ, the vertical edges of which latter will sharply define the vertical folds or bends on them, and the face 136ᵃ will also wipe over the previously downwardly bent fold of the upper end projection of the wrapper, similarly sharply defining its vertical side bend. The upper and lower rectangular flaps having thus been folded, and being still pressed flat against the end of the package by the apron 152, the lower inclined edges of the triangular side flaps, thus formed, will engage the upper ends of the warped surfaces 145ᶜ behind the apron 152; and as the package still further descends, said triangular flaps will be gradually pressed inwardly by said warped surfaces until engaged by the plane surfaces 145ᵇ, by which they are held pressed firmly against the end wall of the package; this operation resulting in a double-pointed end fold, such as is illustrated in Fig. 22.

At the bottom of the vertical chute the package comes to rest upon a horizontal platform 154 supported by and between the side-frames 1 and 2 and extending to the discharge end of the machine. In this platform is formed a longitudinal slideway 155 (Fig. 5) in which is mounted a reciprocable slide 156 carrying on its upper surface a follower 157 of substantially the form and dimensions of the side wall of the package. A pair of spring-pressed side walls 158 supporting a top wall 159 create, with the platform 154, a horizontal chute, along which the packages are forced by the follower 157 to a position opposite the seal-applying mechanism, as shown in Fig. 5, the rear ends of the side walls 158 are cut away with the exception of upper and lower horizontal strips 158ᵃ and 158ᵇ to provide an opening or space through which the suction box or label carrier can operate to apply the seal or label to the end of the package. The mechanism for reciprocating the slide 156 consists of a cam-disk 160 mounted on the shaft 7, said disk having a cam-groove 160ᵃ in one face thereof that engages a roller 161 carried by a forked connecting rod 162 straddling the shaft 7, said rod being connected at its inner ends to the upper end of an arm 163 fast on a transverse shaft 164 mounted in and between the side-frames 1 and 2, said shaft 164 carrying an upwardly extending arm 165 that is pivotally connected to a lug 156ᵃ on the slide 156 through a link 166. These driving connections are clearly shown in side elevation in Fig. 5 and in plan view in Fig. 12. On the upper edge of the follower 157 are secured a pair of rearwardly extending strips 157ᵃ that lie across the vertical chute when the follower is in its forward position, and prevent the dropping of the next package behind the follower. To complete the operation of inclosing the package in the wrapper, we also preferably employ in association and coöperation with the mechanisms thus far described a mechanism for applying a seal to each end of the package, which seal may also have the nature of a label, if desired, and serves to secure and unite the end flaps. Inasmuch as these devices are duplicates on both sides of the machine, a description of one will suffice for both.

Referring more particularly to Figs. 14 to 17, inclusive, 167 designates a bracket secured to the outer face of the main side-frame member of the machine, this bracket supporting on its outer end a seal or label hopper 168, said hopper being pivotally mounted thereon at its outer side by a pair of hinges 169. The rear wall of the hopper has a depending extension 168ᵃ, between which and a cross-frame member of the bracket are interposed a pair of coil springs 170, which normally tip or tilt the hopper as shown in Fig. 15. The depending projection 168ᵃ also carries an adjustable threaded contact pin 171. In the upper ends of the parallel side walls of the bracket 167 are formed upper and lower grooved guides 172 and 173, respectively. In and between the upper guides 172 is mounted a horizontal rod 174 having rollers 174ᵃ, which rod carries the seal-carrier in the nature of a suction box 175 having a perforated face of substantially the form and dimensions of the open lower end of the hopper 168 and of the label or seal to be applied. The interior of this suction box communicates through a nipple 176 and hose 177 with an air-exhausting device hereinafter described.

The lower guide-grooves 173 are engaged by rollers 178ᵃ on the ends of a rod 178 carried by a pair of downwardly extending arms 179 that are rigid with the stem of the suction box 175; said guide-grooves 173 having at a point intermediate their ends a downwardly offset bend 173ª. Secured to the inner side of one of the parallel bracket members directly under the offset bend 173ª of the lower guide-groove is a block 173ᵇ (Figs. 15 and 17) which block has a notch 173ᶜ cut in its upper edge directly beneath the center of the bend 173ª. This notch is engaged by a depending tooth 179ª carried by one of the arms 179, and in so doing rocks the suction box from horizontal to vertical position, and vice versa. The suction box is actuated from the main longitudinal shaft 43 by means of a disk-crank 180 on said shaft, reciprocating a connecting rod 181, the outer end of which latter is connected to a lever 182 fulcrumed at 183 to a bracket 184 on the main side-frame, said lever being connected at its upper end with the shaft 174 through a link 185. It will be seen that the arms 179 connecting the rods or shafts 174 and 178 of the suction box are of such a length relatively to the distance between the upper and lower grooved guides 172 and 173 that the suction box, when traveling through the parallel portions of said guides, is necessarily disposed with its face either horizontal or vertical. When the suction box is engaging the hopper, as in Fig. 14, it is maintained upright or with its operative face horizontal and remains in this position during its inward travel until the rollers 178ª drop into off-sets 173ª of the lower grooves, which permits the turning of said box through an angle of 90 degrees through the engagement of the tooth 179ª and notch 173ᶜ, thereby bringing its seal-carrying face to vertical position just prior to the application of the seal to the carton or package. It will thus be seen that the only bodily travel of the suction box is a straight horizontal travel to effect its proper registration with the hopper and end wall of the package. As the suction box returns from the package to the hopper, a lug 175ª on its rear side strikes the inner end of the contact pin 171, thereby tilting the hopper to vertical position and effecting the registration of its lower end with the mouth of the suction box for the purpose of withdrawing the lowermost seal or label in said hopper. As the suction box starts to move away from the hopper, the springs 170 tilt the hopper so as to carry its lower end away from the mouth of the suction box, thereby preventing the tendency on the part of the latter to withdraw more than one seal at a time.

The suction effect is produced and controlled by the following mechanism. Referring to Figs. 8 and 12, 186 designates an air exhaust pump, driven by a pitman 187 and disk-crank 188 from the shaft 7. One end of said pump is in free communication with a transversely extending pipe 189, to the opposite ends of which latter are connected the flexible tubes or hose 177. In the upper side of the pipe 189 is a vent opening that is normally covered by a cap or valve 190 of rubber, felt, or the like, said valve being hung from one end of a lever 191 pivotally mounted intermediate its ends on a bracket 192. The same end of said lever has a laterally projecting pin 193 that overlies one arm 194 of a bell-crank lever, the opposite arm 195 of which engages, through a roller 196, the face of a cam-disk 197 on the shaft 42. A compression spring 198 between the other arm of said lever 191 and the upper surface of the pipe 189 normally tends to maintain said lever in a position in which the vent opening is closed by the valve 190. The cam 197 is so timed that simultaneously with the application of the seal to the ends of the package by means of the seal carriers or suction boxes, the valve 190 is raised and the suction effect of the pump thereby intermitted, permitting the suction boxes to return without exerting any pull on the applied seals.

Paste is applied to the upper surface of the seal or label as the latter is carried from the hopper to the end of the package by the following mechanism, which, of course, is in duplicate on both sides of the machine. On a pair of transverse bars 199 is mounted the paste-box 200 carrying a pick-up roll 201 and a distributing roll 202. A paste-applying roll 203 is loosely mounted on a shaft 204 carried by and between a pair of bent arms 205 pivoted at 206, said arms being actuated in the upward movement from a cam 207 on the shaft 43, said cam peripherally engaging a roller 208 carried by the inner end of a lever 209 pivoted at 210 to a bracket 211, the opposite end of said lever being connected to the arms 205 through a longitudinally adjustable link 212.

The paste-applying roll 203, as shown in the plan view, Fig. 13, has a central annular groove 203ª, in the under side of which lies a wire strip 213, said wire strip being connected at its ends to a pair of transverse rods 214 and 215 carried by and between the arms 205; the function of this wire being to prevent the seal from adhering to the surface of the pasting roll as it wipes over the latter. The paste rolls are driven from the shaft 9 through a bevel pinion 216 on said shaft (Fig. 5) engaging a bevel pinion 217 on one end of a shaft 218, the opposite end of said shaft carrying a gear 219 which, through a pair of intermediate idler gears 220 and 221, drives a gear 222 on the shaft of the roll 202, a gear 223 on said shaft engaging and driving a gear 224 on the shaft of the pick-up roll 201. Fast with the roll 203 is a gear 225 adapted to engage the gear 223 on the return movement of the paste-applying roll whereby to rotate said roll in contact with the distributing roll 202 to apply a fresh resurfacing of paste to said paste-applying roll. The cam 207 is so set that its flat side engages the roller 208, permitting the roll 203 to drop into contact with the seal carried on the face of the suction box as the latter travels beneath said roll toward the end of a package.

By the mechanism above described the seals are withdrawn one by one from the hoppers, treated to an application of paste on their upper surfaces, and pressed firmly against the folded flaps of the wrapper on the ends of the package.

The seal or label-applying mechanism hereinabove described is not claimed herein, but constitutes the subject-matter of a divisional application filed by us on the 4th day of December, 1907, Serial No. 405,118.

On the next forward movement of the follower 157 the wrapped and sealed package is pushed on into the grip of a package-discharging conveyer mechanism consisting essentially of a pair of endless belts 226 turned around vertical drums 227 and 228 (Fig. 13) at the inner and outer ends of the conveyer, respectively, and engaging intermediate guiding rolls 229 and tension rolls 230; the parallel vertical walls of these conveyer belts being well adapted to the purpose of pressing and holding the fresh seals upon the ends of the package long enough to avoid liability of loosening or withdrawing said seals at the end of the discharging movement. The conveyer belts are given simultaneous and equal intermittent movements from the reciprocations of the follower slide 156 by the means shown in Figs. 5 and 13, wherein it will be seen that to the under side of said slide is pivoted a pair of connecting rods 231, each of which latter is connected at its other end to one arm of a bell-crank lever 232 that is loosely mounted on the shaft of the drum 227, the other arm of said bell-crank lever carrying a pawl 233 engaging a ratchet disk 234 fast on the shaft of the drum. Through these connections the inner drums 227 are, on each forward movement of the slide 156, given a partial rotation that actuates the conveyer belts for a distance equal to the width of a single package.

When the machine is started in operation it is, of course, desirable to throw out of action the seal-applying mechanism until the machine has operated long enough to bring the first package received thereby into the field of action of said seal-applying mechanism. For this purpose we have provided a simple manually operated mechanism which, by a single movement of the operator, serves to both break the exhaust through the suction boxes and prevent the downward movement of the paste-applying rolls into contact with the face of the suction boxes. This mechanism comprises a pair of parallel shafts 235 (Fig. 12) suitably journaled in and longitudinally of the lower part of the machine frame, said shafts carrying at their outer ends cranks 236 connected by a bar 237, by shifting which longitudinally said shafts are oscillated in unison. The inner ends of said shafts underlie the levers 209 outwardly of the pivotal points of the latter; and at the points directly beneath said levers are provided with radially projecting fingers 238 (Figs. 8 and 14) which, when said shafts are so rocked as to throw said fingers to the vertical position, contact the lower edges of said levers, thereby maintaining the rolls 203 and their lifting mechanism elevated above the path of travel of the suction boxes. One of said shafts 235 also has a radially projecting finger 239 (Figs. 8 and 14), the end of which overlies the adjacent arm of the vacuum-controlling lever 191; said finger being so positioned that when the shafts are rocked to raise the levers 209 and put out of commission the pasting mechanism, the finger 239 simultaneously depresses the lever 191, thereby raising the valve 190 and opening the suction pipe 189 to the atmosphere.

On either side of the machine frame are a pair of upstanding levers 240 (Figs. 1, 3 and 4) mounted on a transverse rock shaft 241, the lower end of one of said levers being connected by a bar 242 (Fig. 5) to the usual clutch-shifting mechanism on the main shaft 3, whereby the machine is started and stopped. The shaft 12 is preferably provided on both its overhanging ends with hand wheels 243 by which the machine may be manually operated for purposes of priming, etc.

We have hereinabove described in detail the mode of operation of the different mechanisms of which the apparatus is composed, and it only remains to describe in a general way the operation of wrapping and sealing a package with the machine constructed in the manner hereinabove described. Assuming that the platform of the wrapper feed mechanism is supplied with a stack of wrappers so adjusted that the topmost wrapper is in line with the feeding-in rolls 50 and 51, and that the package chute is supplied with a line of packages disposed in skewwise succession, the machine being started in operation, the topmost wrapper and the foremost package are supplied to the vertical chute beneath the plunger 55; the wrapper lying flat over the fingers of the horizontal wrapper guides 71 and 73 with its forward margin lying across the path of movement of the paste roller 87, and the package resting at its ends upon the spring fingers 67. With the wrapper in this position the paste roll 87 descends and applies a line of paste to the upper surface of the inner margin of the wrapper, immediately following which the plunger 55 descends, forcing the package down past the spring fingers 67 and onto the wrapper, the continued movement of the plunger forcing both package and wrapper downwardly, the guide fingers 71 and 73 yielding and pressing the wrapper up against the sides of the package, until the package has reached a position in the chute where its top surface is just beneath the plane of the horizontal folding blades 112 and 113. The plunger then returns to its elevated position, as shown in Fig. 5, and, the package being held against dropping by the elastic pressure of the side wall 52 of the chute, the blade 112, moving inwardly, bends over the narrower top flap of the wrapper, being followed on its retracting movement by the companion blade 113, which bends over the upper and wider pasted top flap. Upon the retraction of the blade 113, the plunger again descends, bringing with it package and wrapper No. 2, which latter, acting upon the top of package No. 1, forces the latter the depth of one package down the chute.

While the last described operations are taking place on wrapper No. 2, the top end flaps of wrapper No. 1 are folded in by the rotating shoes 134. The plunger then again descends with package and wrapper No. 3, thereby forcing Nos. 1 and 2 the depth of a package down the chute. With this movement the lower end flaps of wrapper No. 1 are folded up against the package by the folder member 136, package No. 2 following one step behind in the folding operations. The descent of the plunger bringing the fourth package and wrapper continues the descent of the three previously inserted packages, in which movement the triangular side flaps on the ends of the wrapper of package No. 1 are partially folded in against the ends of the package by the warped surfaces 145° of the stationary folder, the superposed packages following one step behind each other in the folding operations. The descent of the fifth package and wrapper into the chute carries the first package to the bottom, at which point said foremost and lowermost package, with the wrapper completely folded thereabout, is advanced by the follower 157 to a position opposite the sealing mechanism, at which point in the operation the latter is thrown into operation by shifting the bar 237 in a direction to release the paste-roll actuating lever and the valve lever of the suction pipe. Thereupon the suction boxes 175 extract the lowermost seals from the hoppers 168 and, moving inwardly along the guides 172 and 173, subject said seals to an application of paste from the rolls 203 which are permitted to drop into engagement with said seals at that time and, being swung down into vertical position while passing the offset bends of the guide, press the pasted seal through the openings of the side walls of the chute upon the folded end flaps of the package. As soon as the suction boxes are retracted, the follower 157, which has meanwhile been retracted in rear of the vertical chute, returns with the next package of the series, displacing the foremost package, moving it into the grip of the discharging conveyer, by which latter the package is moved along under light endwise pressure, serving to maintain the seals adhered to the ends of the package until the paste is sufficiently dry to prevent their displacement. On each forward movement of the follower 157, the strips 157ª guard the lower end of the vertical chute against the possible dropping of a package in rear of the follower. Ordinarily the elastic pressure of the side walls of the chute upon the packages suffices to maintain them stationary through friction except when positively depressed by the plunger but the strips 157ª constitute a safeguard against accidental premature descent of the packages through insufficient frictional engagement with the walls of the chute. In this way the packages are advanced in close succession by intermittent or step by step movement through the machine, being subjected successively to the operations of the several mechanisms in the order described. It will be observed that the end flaps of the wrapper are bent or folded down wholly by the mechanisms occupying the open ends of the vertical chute; and that three of the four flaps are both bent and folded by stationary mechanism. This effects a considerable mechanical economy, in that movable folding devices require accurately timed actuating mechanism necessarily of a more or less complicated nature.

It is obvious that numerous and various modifications in the details of construction hereinabove set forth may be made without affecting the substance of the invention or departing from the principle thereof; and hence we do not wish to be understood as limiting the invention strictly to the particular construction herein described and shown.

We claim:

1. In a machine of the character described, the combination with a chute adapted to receive a package and a wrapper, of a plunger for forcing said package and wrapper by pressure applied to a side of the package through said chute, yieldable spring-pressed guides pivotally mounted in the sides of the chute and normally lying across the latter and serving to fold the wrapper upon the sides of the package, blades operating transversely of the chute to form and lay the top longitudinal folds of the wrapper, and means located in the opposite ends of the chute between the side walls thereof serving to form and lay the end folds of the wrapper upon the end walls of the package as the latter is passed thereby.

2. In a machine of the character described, the combination with a chute adapted to receive a package and wrapper, of means for forcing said package and wrapper by pressure applied to a side of the package through said chute, and positively actuated rotary shoes located in the opposite ends of the chute between the side walls thereof serving to bend down the top end folds of the wrapper upon the end walls of the package, said shoes rotating in a plane parallel with the side walls of the chute.

3. In a machine of the character described, the combination with a chute adapted to receive a package and wrapper, of means for forcing said package and wrapper by pressure applied to a side of the package through said chute, positively actuated rotary shoes located in the opposite ends of the chute between the side walls thereof serving to bend down the top end folds of the wrapper upon the end walls of the package, said shoes rotating in a plane parallel with the side walls of the chute, and stationary folding devices also located in the opposite ends of the chute between the side walls thereof serving to subsequently form and lay the bottom and side end folds of the wrapper upon the end walls of the package.

4. In a machine of the character described, the combination with a chute adapted to receive a package and a wrapper, of means for forcing said package and wrapper through said chute, and rotary shoes located in the ends of said chute serving to form and lay an end fold of the wrapper, said shoes each having two flat surfaces disposed at an angle to each other and successively engaging the wrapper.

5. In a machine of the character described, the combination with a chute adapted to receive a package and a wrapper, of means for forcing said package and wrapper through said chute, and rotary shoes located in the ends of said chute serving to form and lay an end fold of the wrapper, said shoes being yieldingly supported on their shafts and each having two flat surfaces disposed at an angle to each other and successively engaging the wrapper.

6. In a machine of the character described, the combination with a chute adapted to receive a package and wrapper, of means for forcing said package and wrapper by pressure applied to a side of the package through said chute, and stationary folders located in the opposite ends of said chute, respectively, each of said folders having a flat surface adapted to form and lay the bottom end fold of the wrapper upon the end wall of the package, spring-pressed surfaces adapted to overlap the ends of the side walls of the package to flatten and define the side end folds, and a pair of inversely disposed warped surfaces serving to lay said side end folds upon said previously laid bottom end fold.

7. In a machine of the character described, the combination with a chute adapted to receive a package and a wrapper, of means for forcing said package and wrapper through said chute, and stationary folders located in the ends of said chute, each of said folders having flat and warped surfaces serving to lay the bottom and side end folds of the wrapper, respectively, and inwardly projecting spring-pressed flanges at its sides serving to hug the ends of the side walls of the package during the folding operation.

8. In a machine of the character described, the combination with a chute adapted to receive a package and a wrapper, of means for forcing said package and wrapper by pressure applied to a side of the package through said chute, and stationary folders located in the ends of said chute, each of said folders having elastically backed flat and warped surfaces serving to lay the bottom and both side end folds of the wrapper, respectively, upon an end wall of the package.

9. In a machine of the character described, the combination with a chute adapted to receive a package and a wrapper, of means for forcing said package and wrapper through said chute, and stationary folders located in the ends of said chute, each of said folders having elastically backed flat and warped surfaces serving to lay the bottom and side end folds of the wrapper, respectively, and inwardly projecting spring-pressed flanges at its sides serving to hug the ends of the side walls of the package during the folding operation.

10. In a machine of the character described, the combination with a vertical chute adapted to receive a package and a wrapper, and a plunger for depressing said package and wrapper into said chute, of yieldable spring-pressed guides hinged in the side walls of the chute and normally lying across the latter and initially supporting the wrapper, means for applying a strip of paste to one edge of said wrapper, reciprocating blades operating transversely of the chute to lay the top longitudinal folds of the wrapper, and means for delaying the return movement of one of said hinged guides to avoid interference with the pasted margin of said wrapper.

11. In a machine of the character described, the combination with a vertical chute and a plunger operating therein to force a series of packages and wrappers therethrough, of means operating to fold the wrappers about said packages while moving through said chute, a horizontal chute communicating at one end with the bottom of said vertical chute, seal-applying devices located opposite the sides of said horizontal chute for sealing the ends of the packages, a reciprocating follower in said horizontal chute serving to successively advance the wrapped packages to said seal-applying devices, and a discharging conveyer engaging the packages at their sealed ends.

12. In a machine of the character described, the combination with a vertical chute and a plunger operating therein to force a series of packages and wrappers therethrough, of means operating to fold the wrappers about said packages while moving through said chute, a horizontal chute communicating at one end with the bottom of said vertical chute, seal-applying devices located opposite the sides of said horizontal chute for sealing the ends of the packages, a reciprocating follower in said horizontal chute serving to successively advance the wrapped packages to said seal-applying devices, and a discharging conveyer comprising a pair of endless belts having parallel sections engaging the packages at their sealed ends.

In testimony that we claim the foregoing as our invention we have hereunto subscribed our names in the presence of two witnesses.

FRANK M. PETERS.
HENRY H. HUNGERFORD.

Witnesses:
SAMUEL N. POND,
FREDERICK C. GOODWIN.